United States Patent
Søe-Knudsen et al.

(10) Patent No.: US 9,248,573 B2
(45) Date of Patent: Feb. 2, 2016

(54) CALIBRATION AND PROGRAMMING OF ROBOTS

(71) Applicant: UNIVERSAL ROBOTS A/S, Odense S. (DK)

(72) Inventors: Rune Søe-Knudsen, Årslev (DK); Esben Hallundbæk Østergaard, Odense C (DK); Henrik Gordon Petersen, Odense NV (DK)

(73) Assignee: UNIVERSAL ROBOTS A/S, Odense S. (DK)

(*) Notice: Subject to any disclaimer, the term of this patent is extended or adjusted under 35 U.S.C. 154(b) by 319 days.

(21) Appl. No.: 13/630,380

(22) Filed: Sep. 28, 2012

(65) Prior Publication Data
US 2013/0079928 A1 Mar. 28, 2013

Related U.S. Application Data

(60) Provisional application No. 61/540,150, filed on Sep. 28, 2011.

(51) Int. Cl.
*B25J 9/16* (2006.01)
*G05B 19/408* (2006.01)

(52) U.S. Cl.
CPC .............. *B25J 9/1682* (2013.01); *B25J 9/1656* (2013.01); *B25J 9/1692* (2013.01); *G05B 19/4083* (2013.01); *G05B 2219/39049* (2013.01); *G05B 2219/40387* (2013.01)

(58) Field of Classification Search
CPC ............ A61B 5/1122; A61B 1/00057; A61B 5/6824; A61B 5/1495; A61B 5/11; A61B 5/1071; A61B 2017/00725; B25J 9/1692; B25J 13/00; B25J 9/1045; B25J 13/085; B25J 9/106; B25J 9/1656; B25J 9/1682; G05B 19/4083; G05B 2219/40387; G05B 2219/39049
See application file for complete search history.

(56) References Cited

U.S. PATENT DOCUMENTS

| | | | |
|---|---|---|---|
| 4,753,569 A | | 6/1988 | Pryor |
| 5,220,261 A | * | 6/1993 | Kempas .................... 318/567 |
| 5,341,289 A | * | 8/1994 | Lee ........................... 700/253 |
| 6,070,109 A | | 5/2000 | McGee et al. |
| 6,519,860 B1 | * | 2/2003 | Bieg et al. .................... 33/503 |
| 6,535,794 B1 | | 3/2003 | Raab |
| 6,822,412 B1 | * | 11/2004 | Gan et al. ................ 318/568.19 |
| 6,856,863 B1 | * | 2/2005 | Sundar ........................ 700/254 |
| 7,300,240 B2 | * | 11/2007 | Brogardh .................... 414/680 |
| 7,571,025 B2 | * | 8/2009 | Bischoff ..................... 700/248 |
| 7,756,608 B2 | * | 7/2010 | Brogardh .................... 700/254 |
| 8,812,155 B2 | * | 8/2014 | Brethe ........................ 700/245 |

(Continued)

OTHER PUBLICATIONS

Robot.pdf (Dictionary.com, Robot | Define Robot at Dictionary.com, Jun. 23, 2015, http://dictionary.reference.com/browse/robot?s=t, pp. 1-5).*

(Continued)

*Primary Examiner* — Bao Long T Nguyen
(74) *Attorney, Agent, or Firm* — Nicholas B. Trenkle; Stites & Harbison PLLC

(57) ABSTRACT

The invention pertains to a method of calibrating robots without the use of external measurement equipment. The invention furthermore pertains to a method of copying working programs between un-calibrated robots. Both methods utilize the properties of a closed chain and the relative position of the links in the chain in order to update the kinematic models of the robots.

40 Claims, 17 Drawing Sheets

(56) References Cited

U.S. PATENT DOCUMENTS

| | | | |
|---|---|---|---|
| 2008/0004632 A1* | 1/2008 | Sutherland et al. | 606/130 |
| 2008/0140258 A1* | 6/2008 | Ueno et al. | 700/260 |
| 2008/0188983 A1 | 8/2008 | Ban et al. | |
| 2008/0188986 A1 | 8/2008 | Hoppe | |
| 2008/0319557 A1* | 12/2008 | Summers et al. | 700/19 |
| 2009/0076655 A1* | 3/2009 | Blondel et al. | 700/254 |
| 2009/0157226 A1 | 6/2009 | De Smet | |
| 2011/0022216 A1 | 1/2011 | Andersson | |

OTHER PUBLICATIONS flange.pdf (Merriam-Webster, Flange | Definition of flange by Merriam-Webster, Jun. 23, 2015, http://www.merriam-webster.com/dictionary/flange, pp. 1-4).*

* cited by examiner

CALIBRATION AND PROGRAMMING OF ROBOTS

CROSS REFERENCE TO RELATED APPLICATIONS

This application claims benefit of U.S. Provisional Application No. 61/540,150, filed Sep. 28, 2011 (which is hereby incorporated by reference).

TECHNICAL FIELD

The present invention pertains to a method of calibrating robots and a method of programming robots.

BACKGROUND OF THE INVENTION

In the field of industrial robotics, the knowledge of the physical characteristics of the robot is important to calculate the exact position of the robot. These characteristics may be defined by a diagram of the robot design, but will vary depending on the assembling process of the robots and the tolerance of its components. In order to refine the knowledge and thereby enhance the robot accuracy, it is necessary to calibrate the model describing it.

Several methods and equipment for the programming of robots have been suggested in the patent literature. In U.S. Pat. No. 6,535,794 is disclosed a three-dimensional coordinate measuring machine utilizing a mechanical measuring arm having known dimensions in order to create an error map of data, which are used to calibrate the robot.

US 2011/0022216 discloses a method and apparatus for calibration of an industrial robot system including at least one robot having a robot coordinate system and a positioner having a positioner coordinate system and being adapted to hold and change the orientation of a workpiece by rotating it about a rotational axis. Target points for the robot are programmed with respect to an object coordinate system. The apparatus comprises a robot controller, at least three calibration objects arranged on the positioner, and a calibration tool held by the robot. The positions of the calibration objects are known in the object coordinate system. The robot controller is configured to determine the positions of the calibration objects with respect to the robot coordinate system, to determine the positions of a first and a second of said calibration objects for at least three different angles of the rotational axis of the positioner, to determine the direction of the rotational axis of the positioner in the robot coordinate system based on the determined positions of the first and second calibration objects for the three angles of the axis, and to determine the relation between the first object coordinate system and the positioner coordinate system by performing a best fit between the known and the determined positions of the calibration objects.

In US 2008/0188986 is disclosed a method and system to provide improved accuracies in multi-jointed robots through kinematic robot model parameters determination. Multi-jointed robots are calibrated by using the chain rule for differentiation in the Jacobian derivation for variations in calculated poses of reference points of a reference object as a function of variations in robot model parameters. The method also utilizes two such reference objects, and the known distance there between, to establish a length scale, thus avoiding the need to know one link length of the robot. An iterative method is used to find the optimum solution for improved accuracy of the resultant model parameters. Furthermore, determination of the end joint parameters of the robot, including parameters defining the tool attachment mechanism frame, is disclosed, which allows for interchange of tools without subsequent calibration.

In US 2008/0188983 is also disclosed a device and method for calibration of a multi-joint industrial robot.

U.S. Pat. No. 6,070,109 pertains to a robot calibration system, which includes a calibration sensor that provides an indication of when a first reference point, which remains fixed relative to a robot base, is a fixed distance from a second reference point, which is located on the robot arm. The robot arm is moved through a plurality of orientations, and each time that the fixed distance between the two reference points is achieved, robot joint position information is determined. The preferred calibration sensor includes a string, which extends between the two reference points and activates a signal generator each time that the string is taut as caused by the orientation of the robot arm. The generated signal indicates that the two reference points are separated by the fixed distance. The determined robot joint positions are then used to determine a calibration factor which varies depending on the needs of a particular situation. Example calibration factors are useful for correcting errors in robot kinematic information, locating the work cell reference frame and locating the tool center point reference frame.

In US 2009/0157226 is disclosed a calibration system for a robot and its peripheral, which system includes an emitter attached to the robot or its peripheral. The emitter emits a laser beam and a receiver also mounted to the robot or its peripheral at a point to permit calibration and for receiving the laser beam and to permit calculations to determine the dimension between the emitter and the receiver.

U.S. Pat. No. 4,753,569 pertains to a method and apparatus for calibrating a computer guided robotic apparatus. At least one camera mounted on the robot arm, or fixed at the work station, views a target comprising a pattern of at least three dots fixed to the other of the robot arm or work station, such viewing taking place as the robot arm approaches the work station to carry out the intended operation. The sensing of any deviation relative to a predetermined target pattern is transmitted to the computer to reset the robot's computerized guidance system.

Thus, although there exists a multitude of ways of calibrating a robot, all of them require some kind of additional active measurement equipment, i.e. measurement equipment comprising sensors, and specialized knowledge of how to use said measurement equipment, and furthermore rely on the accuracy by which the physical characteristics of said equipment is known.

SUMMARY OF THE INVENTION

It is thus an object of the present invention to provide a method of calibrating a multi-joint robot, which is easy to implement, and which does not require the use of external active measurement equipment.

It is furthermore an object of the present invention to provide a method of duplicating a working program between un-calibrated robots.

According to the present invention, the above-mentioned and other objects are fulfilled by a method of calibrating robots, the method comprising the steps of:
(a) providing at least two robots ($R_1$ and $R_2$), each robot ($R_1$, $R_2$) having joints and/or links connecting two flanges: a base flange and a tool flange,
(b) forming a closed chain from the at least two robots ($R_1$, $R_2$), (c) manipulating at least one of the links or joints in the chain, thereby inducing manipulations of some of the other links or joints in the chain, and then (d) estimating kinematic models ($M_1$, $M_2$) for each robot ($R_1$, $R_2$) based on sensor information associated with the joints of each of the at least two robots ($R_1$, $R_2$).

Hereby is achieved a calibration method, which does not depend on the precision of external active measurement equipment—only the robots themselves are used. The inventive method combines the robots into a closed chain in order to obtain information, which is then used to adjust the kinematic parameters of the robots, i.e. used to update the kinematic models of the robots, whereby the robots are calibrated. The necessary information used in the calibration process is generated by modulating the chain in different formations distributed across the available workspace, i.e. by manipulating at least one of the joints of the at least two robots in the chain, thereby inducing manipulations of some of the other links and/or joints in the chain. The calibration, i.e. the estimation of the mathematical kinematic models, is then done by using the properties of the closed chain and knowledge from the links and/or joints in the various chain formations. To define the scaling size of the chain, at least one distance or distance change need to be known. The used links and/or joints in the chain are expressed in a system of equations, which can be solved, thus calibrating the robots. Thus, by using the principle of the closed chain, it is possible to explore large areas of the workspace of the robots, and therefore the outcome of this calibration method to a high degree represents the entire workspace of said robots. This allows a simultaneous calibration of several robots without any measuring equipment besides the robots themselves. By comparing the model representation of the closed chain with multiple physical observations, the parameters of the model can be refined and thus calibrated.

Here it is utilized that in a closed chain, each link is guided by its own constraints to fulfill the constraints of the entire closed chain. This applies for the positions, velocities, accelerations and forces etc. in the chain. By making use of this property, it is possible to estimate the kinematic properties of each links, and thus calibrate the robot's kinematics.

It is understood that throughout the present patent specification, the terms joint or joints can be used for denoting a revolute joint, a prismatic joint or a spherical joint. Depending on the type of joint, the joint can control and register the rotation and/or position. In the following, "position" is used to describe both the rotation and/or position. It is furthermore understood that the chain can comprise links, which are not joints or links, which are joints.

In an embodiment of the method according to the invention, the step (a) of providing at least two robots can be done by providing a single robot having at least two robot arms, and then treat each of said arms as one robot. This type of robots does not have the same number of base flanges as tool flanges.

According to a further embodiment of the method of calibrating robots, the sensor information is obtained from the same sensors, which are used to drive the robot joints and/or links.

According to a further embodiment of the method of calibrating robots, the sensor information is only obtained from the same sensors, which are used to drive the robot joints and/or links.

According to a further embodiment of the method of calibrating robots, the step (c) comprises the sub steps of
changing the joint positions, and thereby the position (Q) of the joints of each of the at least two robots ($R_1$, $R_2$), and collecting the corresponding position pairs ($<R_1Q$, $R_2Q>_m$).

According to a further embodiment of the method of calibrating robots, the sensor information is information about the position (Q) of the joints, and wherein step (d) comprises estimating the kinematic models ($M_1$, $M_2$) based on the collected position pairs ($<R_1Q$, $R_2Q>_m$).

According to a further embodiment of the method of calibrating robots, the sensor information comprises any of the following and/or changes in any of the following: angles, position coordinates, or their derivatives.

According to a further embodiment of the method of calibrating robots, the sensor information comprises any of the following and/or changes in any of the following: force, torque, or their derivatives.

According to a further embodiment of the method of calibrating robots, step (b) of forming a closed chain from the at least two robots ($R_1$, $R_2$) is performed by physically connecting said at least two robots ($R_1$, $R_2$) at least at their base flanges, and/or at their tool flanges.

According to a further embodiment of the method of calibrating robots, the step (b) of forming the closed chain from the at least two robots ($R_1$, $R_2$) further comprises a step of fixing at least one distance between the at least two robots ($R_1$, $R_2$).

According to a further embodiment of the method of calibrating robots, the step (b) of forming a closed chain from the at least two robots ($R_1$, $R_2$) further comprises a step of fixing at least one direction of the connection between the at least two robots ($R_1$, $R_2$).

According to a further embodiment of the method of calibrating robots, the step (b) of forming a closed chain from the at least two robots ($R_1$, $R_2$) comprises the step of using measurement equipment to measure the relative positions between the at least two robots ($R_1$, $R_2$).

According to a further embodiment of the method of calibrating robots, the measurement equipment is configured for measuring the distance between parts of the at least two robots ($R_1$, $R_2$).

According to a further embodiment of the method of calibrating robots, the measurement equipment is configured for determining the direction between parts of the at least two robots ($R_1$, $R_2$).

According to a further embodiment of the method of calibrating robots, the measurement equipment is at least one ball bar connecting the at least two robots ($R_1$, $R_2$).

According to a further embodiment, the sensor information comprises any information given by the link in the closed chain to fulfill the model regarding both the static and dynamic part of the calibration. For example—but not limited to—position and force information and its derivatives.

While it is understood that other kind of sensor information could be used, using the angles is a very practical way of representing positions of the joints of robots with revolute joints. The forces and torque readings/estimations and/or momentum calculation could also be calibrated according to the present method—not only the dimensions of the robots.

It is not a constraint that the robots need to be connected physically to each other as long as information to close the chain is provided. Hence, according to a further preferred embodiment, step (b) of forming a closed chain from the at least two robots comprises the steps of: Fixing the at least two robots together at their base flange, and at their tool flange. This provides two well-defined distances, by which the models can be scaled. Another possibility is to use statistical knowledge of the robots to scale the model (e.g. by Tikhonov regularization). This statistical knowledge could be based on a number of robots of the same kind, and/or the technical drawings of the robot itself.

According to a further embodiment, the step (b) of forming a closed chain from the at least two robots comprises the steps of: Using extra links in the chain that provide information or properties than those used to close the chain. For example, a ball-bar can fix or measure a distance of a link connecting the robots which provide a property of at least one dimension that can be modulated to be used in the calibration.

According to a further embodiment, the step (b) of forming a closed chain from the at least two robots comprises the steps of using measurement equipment to measure the relative positions of the at least two robots. For example, the measurement equipment could be a ball bar measuring the distances between the flanges of the robots.

According to a further embodiment, the base and tool flanges of the at least two robots do not share a same rotational axis in order to reduce the dependencies between the connected joints of the robots. This will reduce the possibility of calibrating all the links but still be usable as the necessary kinematics properties can be estimated in order to model the closed chain.

According to a further embodiment, the step (d) of estimating the kinematic models is furthermore based on an estimation or measurement of the offset between the at least two robots at their base flange, and at their tool flange. Hereby it will be possible to use one or both of these two distances to scale the sizes of the models. An alternative possibility is to use statistical knowledge of the robots to scale the model (e.g. by Tikhonov regularization).

According to a further embodiment, the step (d) of estimating the kinematic models $(M_1, M_2)$ is furthermore based on statistical information about at least one part of the chain.

According to a further embodiment, the statistical information is used to estimate the models $(M_1, M_2)$ based on sensor information which exceeds the number of equations, without statistical information, to be solved.

In yet another preferred embodiment, the inventive method further comprises the step of evaluating whether sufficient sensor information associated with the joints of each of the at least two robots is obtained after step (d), but before step (e). Hereby is achieved that the number of unknowns does not exceed the number of equations to be solved.

A further preferred embodiment of the method moreover comprises the step of evaluating whether sufficient position pair data $(<R_1Q, R_2Q>_m)$ are obtained after step (d), but before step (e), and then
repeat step (d) if not sufficient position pair data $(<R_1Q, R_2Q>_m)$ are obtained in order to estimate the kinematic models, or
perform step (e) if sufficient position pair data $(<R_1Q, R_2Q>_m)$ are obtained in order to estimate the kinematic models.

According to a further embodiment of the present invention, the method comprises the step of collecting an overhead percentage (OPI) of sensor information, in addition to what is necessary for solving the equations in order to update the kinematic models. Hereby is ensured a stable convergence of the kinematic models.

According to a further embodiment, the method also comprises the steps of
retaining at least a fraction of said overhead percentage (OPI) of sensor information from being used to update the kinematic models,
saving said fraction of said overhead percentage (OPI) of sensor information on a data storage device,
verifying the calibration using said fraction of overhead percentage of sensor information.

Since said fraction of OPI is not used to update the models, it can be used to verify the models, i.e. to verify whether the angles or positions correspond to what is predicted by the estimated models. Thus, the step of verifying the calibration may in an embodiment comprise the steps of comparing said fraction of the collected overhead percentage of sensor information with corresponding values predicted by the updated kinematic models for the robots. Preferably, said comparison is performed by calculating a difference between every one of said fraction of the collected overhead percentage of sensor information and corresponding values predicted by the estimated kinematic models for the robots, and comparing said difference, or its numerical value, with a threshold value.

According to a further embodiment, said overhead percentage of sensor information (OPI) is in the range between 10% and 200%, preferably between 20% and 80%, even more preferably between 20% and 60%, or alternatively in the range between 10% and 20%, or in the range between 20% and 40%, or in the range between 40% and 60%, or in the range between 60% and 80%, or in the range between 80% and 100%, or in the range between 100% and 120%, or in the range between 120% and 140%, or in the range between 140% and 160%, or in the range between 160% and 200%.

According to an embodiment, the method further comprises the step of saving the updated kinematic models on a data storage device, which could be placed in a robot controller operatively connected to the robot, or on another device.

According to a further embodiment, the step (c) of manipulating at least one of the links and/or joints of the at least one robot in the chain is performed by turning off at least one of the position regulators of the joints of one of said two robots, and let it be led around by the other robot.

According to a further embodiment, the step (c) of manipulating at least one of the joints of the at least one robot in the chain over at least a part of the full workspace of the robots is performed by turning off at least one, for example all, of the position regulators of the joints of each of said two robots, and change the joint positions externally, for example manually by an operator.

According to yet a further embodiment, the step (c) of manipulating at least one of the joints of the at least one robot $(R_1, R_2)$ in the chain is performed by turning off at least one of the position regulators of the joints of each of said two robots $(R_1, R_2)$, and change the joint position manually.

According to a further embodiment, the kinematic models $(M_1, M_2)$ are determined by parameters defining transformations.

According to a further embodiment, the parameters are two types of Denavit-Hartenberg parameters. The two types of Denavit-Hartenberg parameters may be represented by the Schilling parameters, and the parallel variant parameters, respectively.

According to yet another embodiment of the invention, the method further comprises the step of adjusting the force by which the at least two robots $(R_1, R_2)$ operate. According to a further embodiment, each of the models $(M_1, M_2)$ comprises a transformation for each joint.

As mentioned, the kinematic models of the at least two robots are preferably determined by two types of Denavit-Hartenberg parameters. The two types of Denavit-Hartenberg parameters may be represented by the Schilling parameters, and a variation designed for parallel rotation axis, respectively. The variation is here after called parallel DH parameter. The chosen notations with 4 parameters are both a minimal and complete way to describe the transformation between rotation axes. However, other notations can also be used.

The method may according to a further embodiment furthermore comprise the step of adjusting the force by which the at least two robots operate. Preferably, each of the models comprises a transformation for each joint of each of the at least two robots.

The method as described above can be extended to cover more than two robots. Hence, according to a further embodiment, the method further comprises the steps of connecting N additional robots in parallel or in series with the at least two robots, N being a natural number and performing the steps of the inventive method for each additional N robots.

According to a further embodiment, said at least two robots ($R_1$, $R_2$) are two robot arms of a single robot. In a further embodiment, at least one of said arms may be an articulated robot arm. Furthermore, at least one of said arms may comprise a prismatic joint. Said single robot has at least one base flange and at least two tool flanges, and in any case more tool flanges than base flanges.

To use a working program directly from another robot it is necessary that the proportions of both robots are identical and that the position sensors are equally adjusted. As this is very difficult to achieve, it may be difficult to duplicate a program between robots. It is therefore a further object of the present invention to provide a method of duplicating a program between—possibly un-calibrated—robots.

This and further objectives are achieved by a second aspect of the invention pertaining to a method of converting a working program from a first robot $R_1$ to a second robot $R_2$, each robot ($R_1$, $R_2$) having joints connecting two flanges: a base flange and a tool flange, the method comprising the steps of:
  (a) replacing the first robot $R_1$ with the second robot $R_2$,
  (b) providing a working program $R_1P$ associated with the first robot $R_1$,
  (c) choosing a number of positions or angles in accordance with the working program $R_1P$ and moving the second robot $R_2$ to those positions, thereby providing a position or angle pair data set <$R_1Q$, $R_2Q$>, and then
  (d) estimating kinematic models ($M_1$, $M_2$) of said at least two robots, base flange offset ($T_{base}$) and tool center point offset ($T_{tcp}$) using the position pair data set <$R_1Q$, $R_2Q$>, and then
  (e) performing a working program conversion on the basis of said estimated kinematic models ($M_1$, $M_2$).

Often a need emerges to replace one robot with a newer one. However, instead of performing a calibration of the new robot, the joint angles of the "old" robot can be used as one half of the chain in the mathematical model and the corresponding angles of the "new" robot as the other half of the chain. Hereby is achieved as mentioned in step (c) above a set of angle pair data, which are used to update the kinematic models of the robots.

An embodiment of the second aspect of the invention further comprises the step of evaluating whether the program can run on the second robot within suitably chosen tolerances.

A further embodiment of the second aspect of the invention further comprises the step of choosing an additional number of positions in accordance with the working program $R_1P$ and moving the second robot $R_2$ to those additional positions, thereby providing an extended position pair data set, and then performing steps (d) and (e), using this extended position pair data set if the program cannot run on the second robot within the suitably chosen tolerances.

A further embodiment of the second aspect of the invention further comprises the steps of converting another working program on the basis of the estimated kinematic models ($M_1$, $M_2$).

A further embodiment of the second aspect of the invention further comprises step (e) of performing the working program conversion on the basis of said estimated kinematic models, and comprises the sub steps of:
  applying forward kinematics on all $R_1Q$ in $R_1P$ with the estimated kinematic model $M_1$ associated with the first robot $R_1$ resulting in the program $R_1K$,
  applying inverse kinematics on $R_1K$ with the estimated kinematic model $M_2$ for the second robot $R_2$, thereby giving the positions $R_2Q$, and then
  replacing $R_1Q$ in the program $R_1P$ with the corresponding $R_2Q$, thereby giving a working program $R_2P$ associated with the second robot $R_2$, whereby the program conversion is completed.

According to a further embodiment of the second aspect of the invention, the kinematic models ($M_1$, $M_2$) are determined by parameters defining transformations.

According to a further embodiment of the second aspect of the invention, the kinematic models ($M_1$, $M_2$) are determined by three types of Denavit-Hartenberg parameters.

According to a further embodiment of the method according to the second aspect of the invention, the three types of Denavit-Hartenberg parameters are represented by the Schilling parameters, the parallel DH variant parameters, and Roll-Pitch-Yaw rotation with translation parameters. Hereafter called RPY.

According to an embodiment of the method according to the second aspect of the invention, the RPY parameters are used to modulate the last joint of the robot. Other notation to modulate a full rotation and translation could also be used. But RPY notation is a minimal and complete notation of 6 parameters for small rotation changes.

According to a further embodiment of the second aspect of the invention, the kinematic models ($M_1$, $M_2$) are estimated by using predetermined models as a starting point. These predetermined models may be approximated models for example determined by using statistical information of the kind mentioned above.

BRIEF DESCRIPTION OF THE DRAWINGS

A further understanding of the nature and advantages of the present invention may be realized by reference to the remaining portions of the specification and the drawings. In the following, preferred embodiments of the invention are explained in more detail with reference to the drawings, wherein FIG. 18 illustrates an embodiment of a flowchart for collecting data pairs to be used in program conversion.

DETAILED DESCRIPTION

Figure 1:
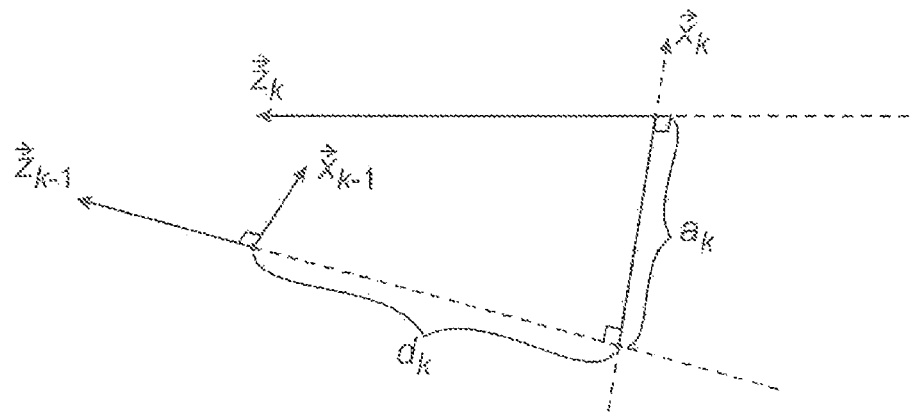
FIG. 1 illustrates Schillings Denavit-Hartenberg notation.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

Classic kinematics is used to model the robots. This makes it possible to transfer information from the robot joints to the Cartesian coordinate system in order to make their joints comparable.

Notation

The used notation is as follows:
$T_c(\theta)_r$,
which is a homogeneous transformation of a $\theta$ rotation clockwise around axis c, where c is x, y or z.
$T_c(s)_r$,
which is a homogeneous transformation of s translation along axis c, where c is x, y or z.
$T_j^i$,
which is a homogeneous transformation from i to j.
$Z_j^i$,
which is z-axis unit vector for the homogeneous transformation from i to j.
$P_j^i$,
which is position from i to j.

Robot Representation

The robots are modeled with two types of Denavit-Hartenberg, DH, parameters. The first type of DH uses the Schilling notation (c.f. R. J. Schilling. "Fundamentals of Robotics: Analysis and Control". Simon & Schuster Trade, $1^{st}$ ed. 1996, incorporated in its entirety by reference) to describe a transformation between two non parallel z-axes, since the notation has a singularity when the z-axis is parallel (see equation 1 below).

Figure 2:
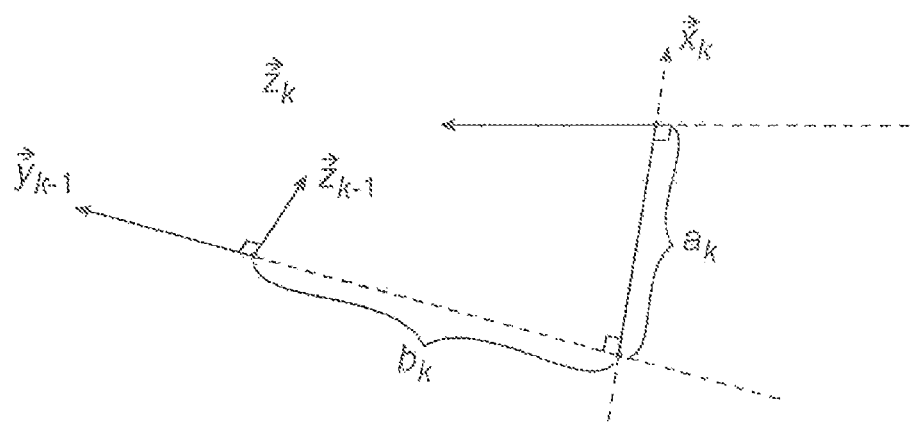
FIG. 2 illustrates Parallel Denavit-Hartenberg notation variant.

The second type uses a DH parallel variant to avoid this singularity (see equation 2 below). The parallel DH variant uses the same principles as the original DH, but has a singularity when the first y and the next z-axis, respectively, is parallel. The singularity of Schilling DH is defined by the normal between the first and next z-axis, since the distance to the normal intersection with the first z-axis is used as a parameter, see illustration FIG. 1. The singularity of the parallel DH variant is defined similarly to the Schilling notation, but the singularity is moved by using the normal between the first y and the next z-axis, see FIG. 2.

Choosing the right notation for each joint element results in a representation of the robot without any DH parameter singularities:

$$\Phi_{DH}(\theta,d,\alpha,a) \equiv T_z(\theta)_r T_z(d)_t T_x(\alpha)_r T_x(a)_t \quad (1)$$

$$\Psi_{DH}(\beta,b,\alpha,a) \equiv T_x(\beta)_r T_x(b)_t T_x(\alpha)_r T_x(a)_t \quad (2)$$

Closed Chain Model

Figure 4:
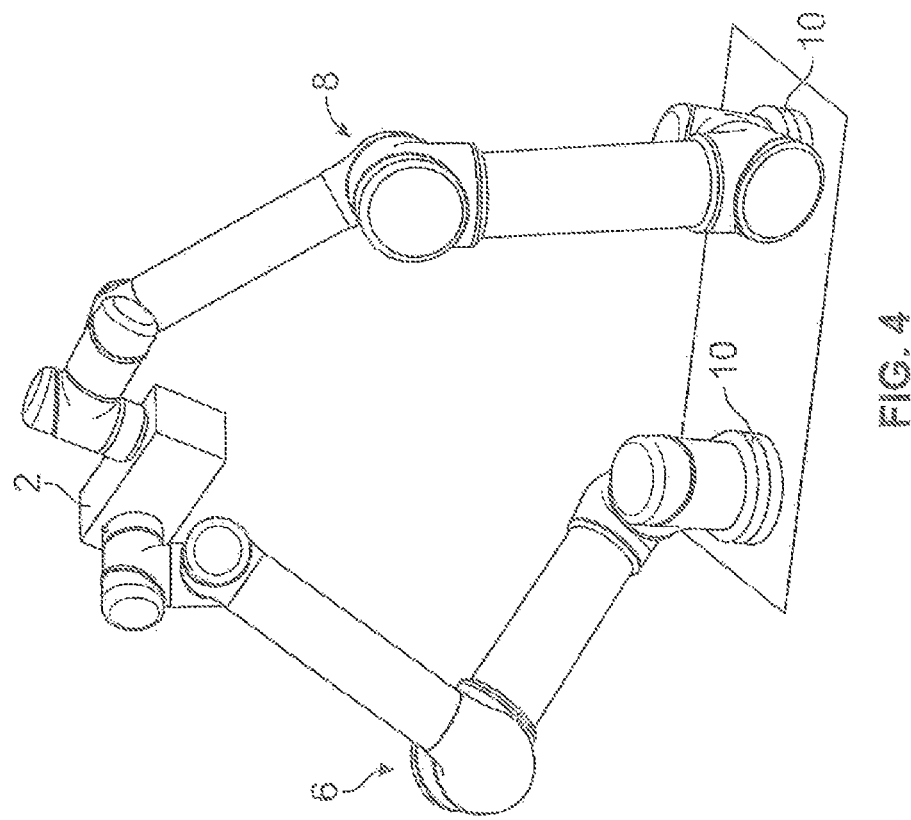
FIG. 4 illustrates an alternative closed chain configuration of two robots, FIG. 5 schematically shows the transformations of two 6-link robots connected in a closed chain configuration, FIG. 6 schematically illustrates the representation of an un-calibrated chain of two robots, FIG. 7 schematically illustrates how a distance can be used to define the scale of a model.
Figure 3:
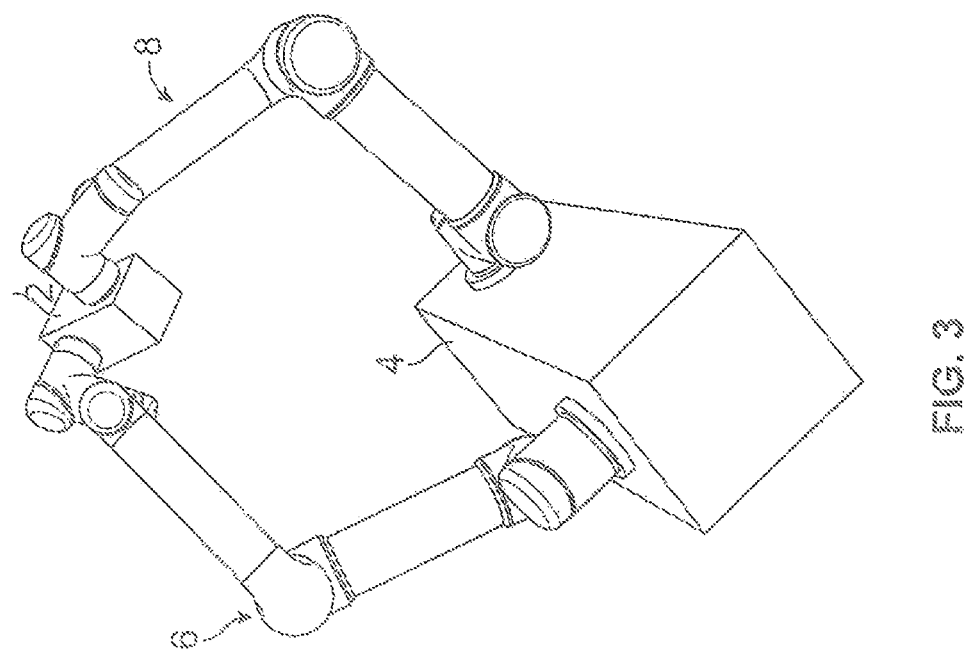
FIG. 3 illustrates a closed chain configuration of two robots.
Figure 5:
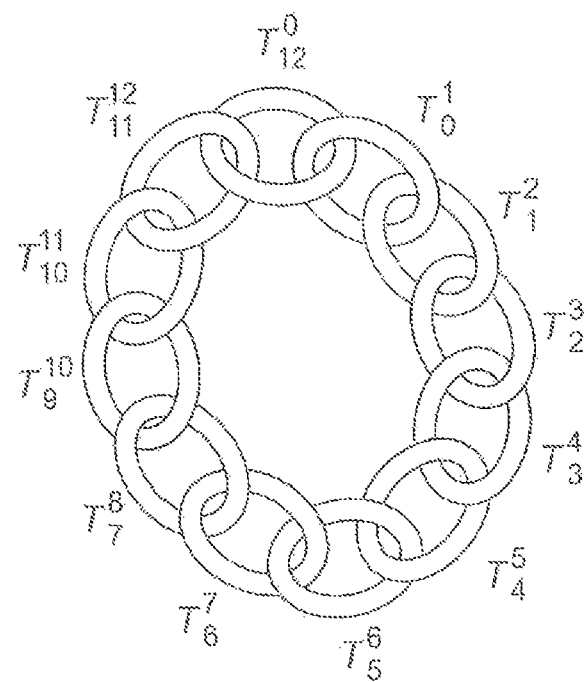

The representation combines each element in the chain to one model. The model reflects the physical characteristic of the closed chain, and makes it possible to relate each element to each other. Depending on the equipment used to connect the robots, different approaches may be used. In the basic installation, the tool flanges are connected via a stiff solid adapter 2, and the base flanges are connected with a stiff solid adapter 4 and all the joints in the chain are represented by DH parameters as described above. This has the advantages as being a minimal complete representation describing the joints' rotational axes in the system relative to each other, see illustration FIG. 3 showing two robots 6 and 8, connected to each other in a closed chain via the adapters 2 and 4. In FIG. 4 is illustrated an alternative closed chain configuration of two robots 6, 8, which are connected at their tool flanges via the adaptor 2. The base flanges 10 are mounted on a surface, from which distance between the base flanges 10 can be determined, which is enough information in order to "close the chain". In FIGS. 3 and 4 are illustrated two industrial robots 6 and 8, of the type UR5 manufactured by Universal Robots.

Advanced Chain Combinations

A more advanced adapter can be used to connect the tool and base flanges 10. Preferably, the model is configured to reflect the used equipment. An example of an advanced way to connect the base flanges 10 of the robots 6, 8, could include a prismatic joint that can displace the robots 6, 8 with a known distance. Another example of adding a more advanced joint to the chain could be done with a ball-bar or an additional joint. The ball-bar is a common known tool for calibration of single robot (c.f. M. R. Driels: Using passive end-point motion constraints to calibrate robot manipulators. Journal of Dynamic Systems, Measurement, and Control, 115(3): 560-566, 1993—hereby incorporated by reference in its entirety). This method works by mounting one of the ball-bar ends to a fixed location and the other end to the robot. This means that all observations are done relative to the fixed location and therefore limited by it. The movement is also limited due to the fixed location. When the equipment is used in the context of the present invention, each end is mounted on each robot 6, 8 and the measurements will therefore not be limited to a fixed location. This gives the possibility to take measurements that relate to the whole workspace of the robots 6, 8.

Some robots have multiple limbs. By treating them as individual robot arms, the method according to the invention, which is described in the present patent specification, can be used to calibrate these limbs without additional active measurement equipment.

Figure 6:
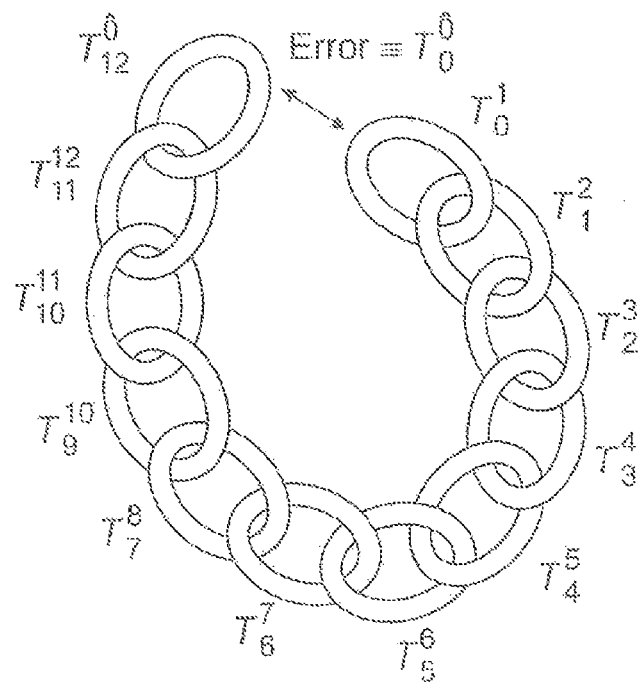

The method according to the invention is based on the closed chain principle, as illustrated in FIG. 6. By transferring this principle to a model, one can achieve a calibration method where feedback is embedded, without the need for additional measuring equipment. Then modeling it mathematically, the model can be adjusted to fulfill the principle of the closed chain and thus calibrate the mathematical model of the physical joints of the robots 6, 8. Mathematically, an error is calculated in the model, by opening the chain and then calculating the difference between two joint ends, see illustration in FIG. 7. The robots are not disconnected physically in order to determine the error—this is a purely mathematical trick. The process of adjustment of the kinematic models is done with a Newton-Raphson approach by collecting enough observations from the robots 6, 8 in order to describe the whole workspace, in a system of equations that guide the solver to the right solution. Preferably, so many observations—sensor information—are collected that an over-determined system of equations is achieved, thereby leading to a stable convergence to the right solution.

Least Squares Function

Figure 7:
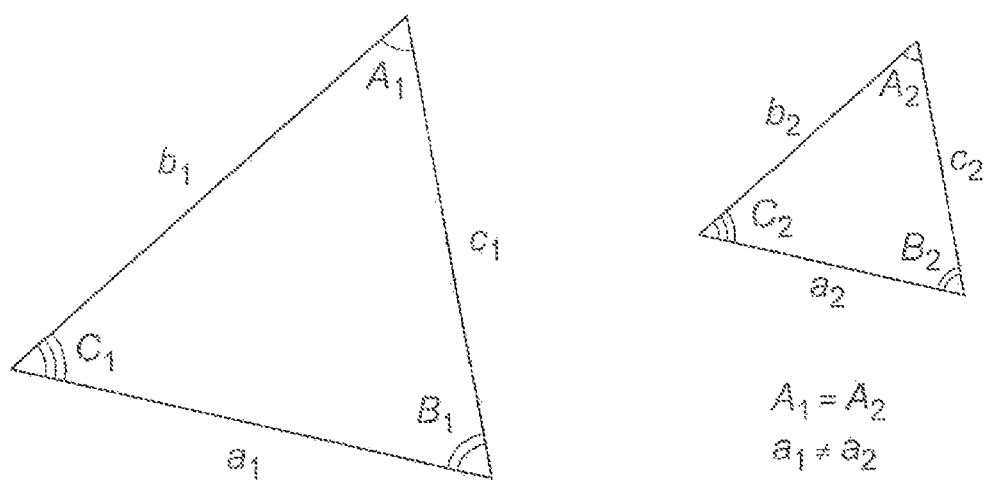

The—preferably over-determined—system of equations is solved by a least squares function that represents the squared error. In equation 3, the transformation represents the error for the joints in the open chain as illustrated in FIG. 7:

$$\text{Error} = T_0^0 = T_0^1 T_1^2 \ldots T_{n-1}^n T_n^0 \quad (3)$$

The position error is taken into account by calculating the squared length of the Error's translation part, see equation 4:

$$e\text{Pos}^2 = \|p_0^0\|^2 = p_0^0 \cdot p_0^0 \quad (4)$$

The rotation error is calculated by the axis angle notation AA (c.f. Robert J. Schilling: Fundamentals of Robotics: Analysis and Control. Simon & Schuster Trade, $1^{st}$ edition, 1996). The error of angle is found by calculating the AA from the Error rotation part, see equation 5:

$$\{\text{angle}, \vec{\text{axis}}\} = AA(R_0^0) e\text{Rot} = \text{angle} \quad (5)$$

The resulting least squares equation is a squared sum of equations 4 and 5 for N observations, see equation 6:

$$e\text{Sum}^2 = \sum_{n=0}^{N-1} e\text{Pos}_n^2 + e\text{Rot}_n^2 \quad (6)$$

representing the error gap between the chain ends as illustrated in FIG. 6.

Constraints

In order to scale the model properly it is necessary to have a known distance or distance change in the model. This can be illustrated by trigonometry as in FIG. 7 where the angles of the triangles are the same but the scale is different. A way to estimate the scale factor of the model is by implementing a model where a known distance can be defined and fixed. Or design a distance that can be fixed in the used model. Another possibility is to use statistical information about the expected dimensions of the robots and use it to regulate the scale guess. This can for example be done by a Tikhonov regulation.

Collecting Observations

In order to use the method, as described above, is it necessary to collect and save observations from the physical chain in order to imitate it with the mathematical representation. The observations can be collected both manually supervised by an operator or automatically by the robots moving autonomously around in the workspace. It is necessary to collect enough measurements distributed in the whole workspace. This is due to the fact that the calibration can only be assumed to represent the used workspace. As the robots 6, 8 need to be connected and follow each other, it is furthermore preferred that the position regulators of some of the joints can be turned off and be led around by the others. It is necessary to manipulate the chain of robots 6, 8 without any use of inverse kinematics, since the kinematics is not known due to the lack of calibration.

Evaluation

A reliable evaluation of the final calibration uses the estimated mathematical model and compares it with the observations. It is important that these observations are independent from those used in the calibration procedure and distributed throughout the workspaces of the robots. If the observations from the calibration are used to evaluate the calibration, then the result will not be trustworthy as no new information has been added to support the result. Another reliability indication for the quality of the results is to let the calibration adjust on physical known parameters and afterwards compare it with the known values.

Having joints of the robots 6, 8 connected in a closed chain opens the possibility to adjust other parameters than those, which relate to determination of the position. An example of these parameters could be to adjust parameters that relate to the forces in the chain.

Calibration Example

Figure 8:
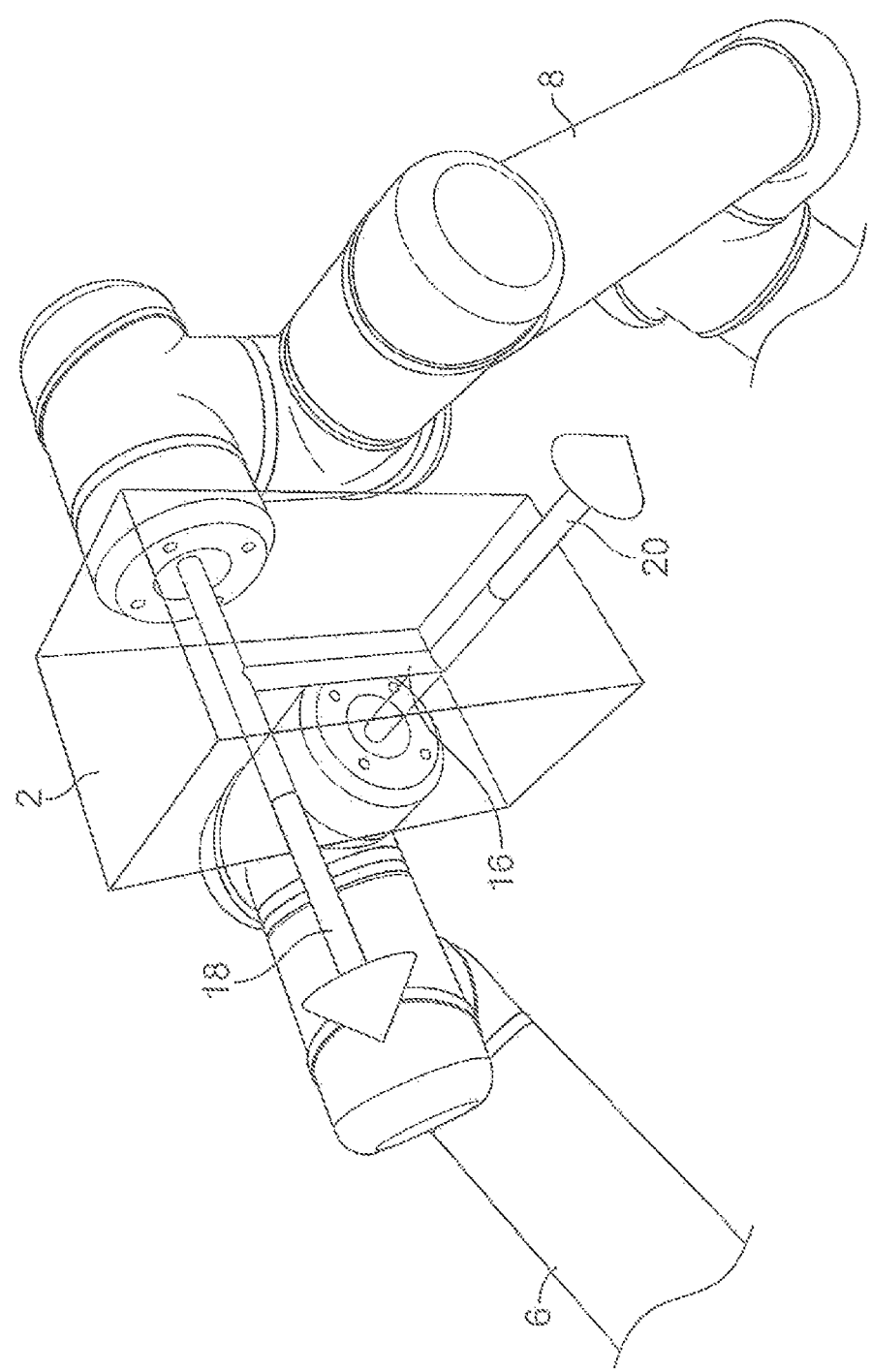
FIG. 8 illustrates an adapter defining a common normal between two rotation axes.

The object of this example is to illustrate and explain how the method according to the invention can be used on specific robots manufactured by the applicant, Universal Robots. The setup includes two UR-6-85-5-A industrial serial robots 6, 8 and two solid passive adapters to connect the tool and base flanges. In FIG. 8 only the solid adapter 2 used to connect the tool flanges is shown. This specific type of robots 6, 8 has six degrees of freedom divided on two revolute joints that are parallel and four which are perpendicular with the previous rotation axis. To make a pure static kinematic calibration of the two robots 6, 8 it is needed to mount them on fixed positions relative to each other. The adapters 2 that close the chain are designed so that the connected end joints do not share the same rotational axis as this would introduce some unwanted model dependencies between the joints. In this example, the tool and base flanges are connected with a known displacement and rotation of 90 degrees in order to optimize the setup to the Schilling DH notation. To define the scale of the closed chain model it is possible to use statistical information about the robots or a fixed dimension in the model. In this implementation it has been chosen to use a fixed known dimension. The known dimension is the length of the common normal 16 between the two rotational axes 18, 20. The length of this normal is directly represented by the DH "a" parameter and can therefore be defined and fixed (see FIG. 8).

Representation

Figure 9:
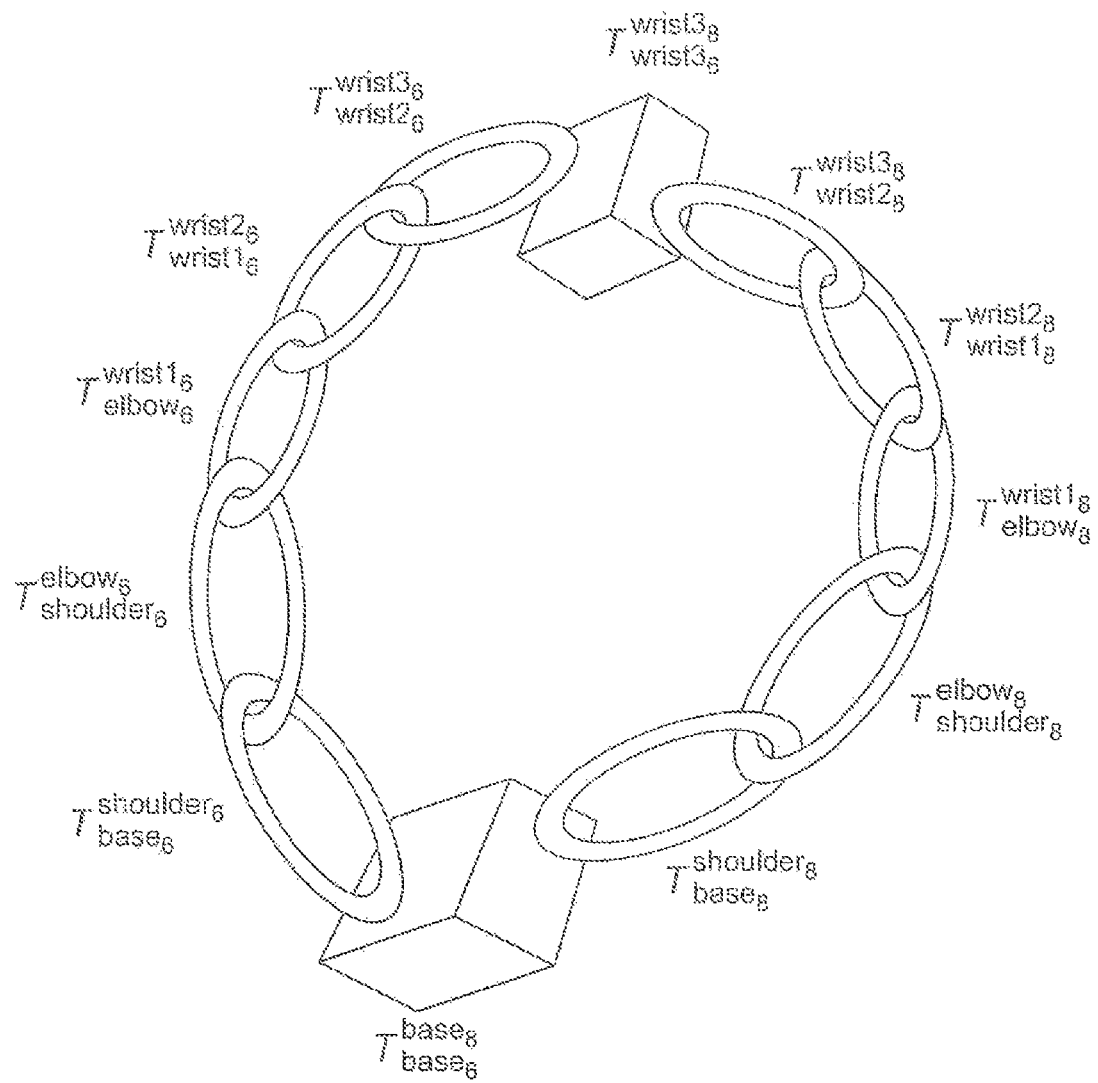
FIG. 9 illustrates where the transformations in table 1 are placed in the system.

The model of the closed chain includes a transformation for each joint as illustrated in FIG. 9. To use the same representation for both robots, the error calculation changes but still calculating the same error as in equation 7 below:

$$T_{base}{}^{wrist3} = T_{base}{}^{shoulder} T_{shoulder}{}^{elbow} T_{elbow}{}^{wrist1} T_{wrist1}{}^{wrist2} T_{wrist2}{}^{wrist3}$$

$$\text{Error} = [T_{base_6}{}^{wrist3_6} T_{wrist3_6}{}^{wrist3_8}]^{-1} [T_{base_6}{}^{base_8} T_{base_8}{}^{wrist3_8}] \quad (7)$$

The connection between the robots can be represented with an extended version of DH (see equation 8 and 9 below). This representation makes it possible to represent any transformation in a similar way as DH which gives the same advantages.

$$T_{\Phi DH}(\theta_1, d_1, \alpha, a, \theta_2, d_2) = T_z(\theta_1)_r T_z(d_1)_t T_x(\alpha)_r T_x(a)_t T_z(\theta_2)_r T_z(d_2)_t \quad (8)$$

$$T_{\Psi DH}(\beta_1, b_1, \alpha, a, \beta_2, b_2) = T_x(\beta_1)_r T_x(b_1)_t T_x(\alpha)_r T_x(a)_t T_x(\beta_2)_r T_x(b_2)_t \quad (9)$$

The parameters for each transformation of the closed chain model are described in table 1 below. The fixed distances are represented in the model with the "a" parameter (see table 1). The same design trick is done for both the connection, the tool and base flanges, both of them can be fixed with a known normal length. As mentioned above it is preferred—but not necessary—to have multiple pre-known parameters in the system. This makes it possible to include one of them as a ground true to evaluate the outcome of the calibration.

TABLE 1

Table describing the adjustable and fixed (the "a" parameter) parameters of the representation of the model for the setup where the robots 6, 8 are displaced with 90 degrees.

| Description | Robot$_6$ | Robot$_8$ |
|---|---|---|
| $T_{wrist3_6}{}^{wrist3_8}$ | | $T_{\Phi DH}(\theta_1, d_1, \alpha, \hat{a}, \theta_2, d_2)$ |
| $T_{wrist2}{}^{wrist3}$ | $\Phi_{DH}(\theta, d, \alpha, a)$ | $\Phi_{DH}(\theta, d, \alpha, a)$ |
| $T_{wrist1}{}^{wrist2}$ | $\Phi_{DH}(\theta, d, \alpha, a)$ | $\Phi_{DH}(\theta, d, \alpha, a)$ |
| $T_{elbow}{}^{wrist1}$ | $\Psi_{DH}(\beta, b, \alpha, a)$ | $\Psi_{DH}(\beta, b, \alpha, a)$ |
| $T_{shoulder}{}^{elbow}$ | $\Psi_{DH}(\beta, b, \alpha, a)$ | $\Psi_{DH}(\beta, b, \alpha, a)$ |
| $T_{base}{}^{shoulder}$ | $\Phi_{DH}(\emptyset, \cancel{d}, \alpha, a)$ | $\Phi_{DH}(\emptyset, \cancel{d}, \alpha, a)$ |
| $T_{base_6}{}^{base_8}$ | | $T_{\Phi DH}(\theta_1, d_1, \alpha, \hat{a}, \theta_2, d_2)$ |

In order to use the calibrated model in the controller of the robots 6, 8, it is necessary to re-compute the transformations into the needed format. Including extraction of useful information from $T_{base_6}{}^{base_8}$ and $T_{wrist3_6}{}^{wrist3_8}$. In this case the Schilling DH notation.

Figure 10:
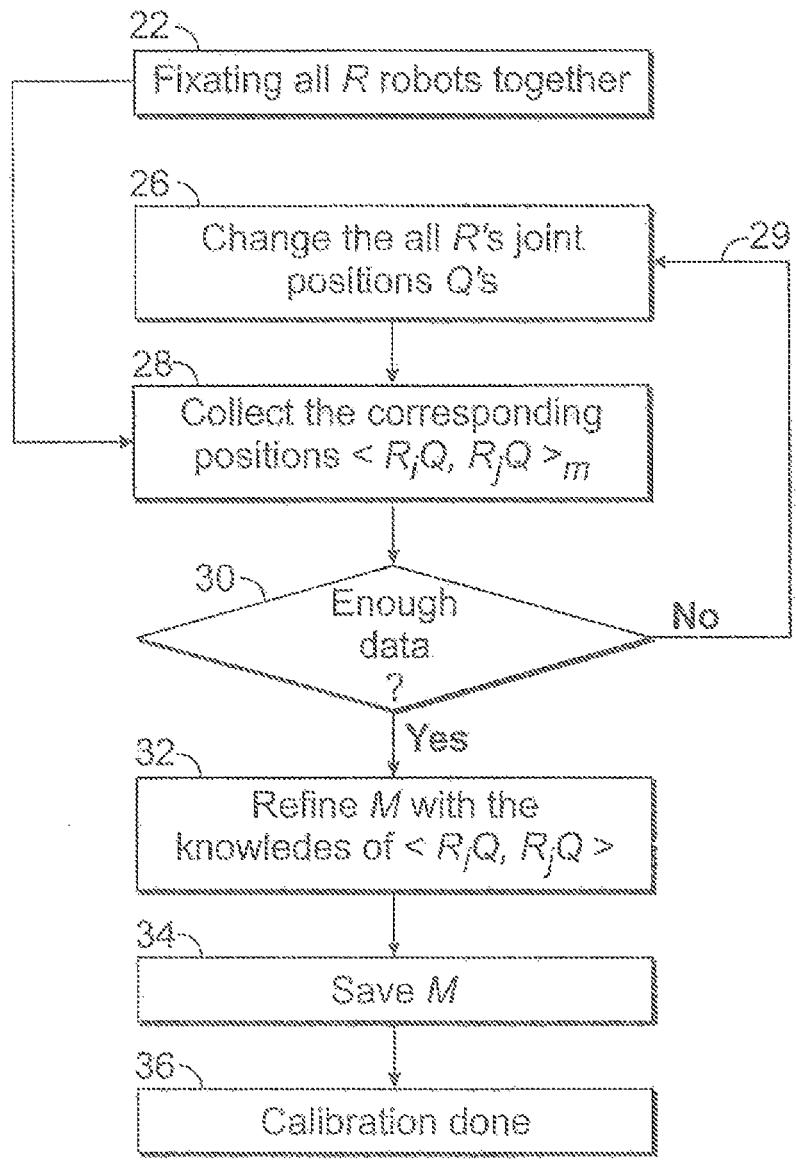
FIG. 10 shows a flow diagram illustrating an embodiment of a method of calibrating R robots.

FIG. 10 shows a flow diagram illustrating an embodiment of the method of calibrating R robots, R being a natural number equal to or greater than 2. The illustrated embodiment comprises the steps of: Providing R robots having multiple joints, a base flange and a tool flange. In step 22 a closed chain is formed from the R robots. Then in step 28 the corresponding position pairs ($<R_iQ, R_jQ>_m$) are collected. Then, in step 30 it is evaluated whether enough data is collected in order to estimate the models. If this is not the case, then step 26, the joint positions of the robots, is changed and the corresponding position pairs ($<R_iQ, R_jQ>_m$) are collected as indicated by the block 28. Then again in step 30 it is evaluated whether enough data has been collected. If this is not the case, than the steps 26 and 28 are repeated as indicated by the arrow 29. However, if sufficient data has been collected then the models are updated or refined or estimated by using the knowledge of the collected position pair data sets $<R_iQ, R_jQ>$, as indicated by step 32. These updated models are then saved in step 34, whereby the calibration is completed as indicated by step 36.

Figure 11:
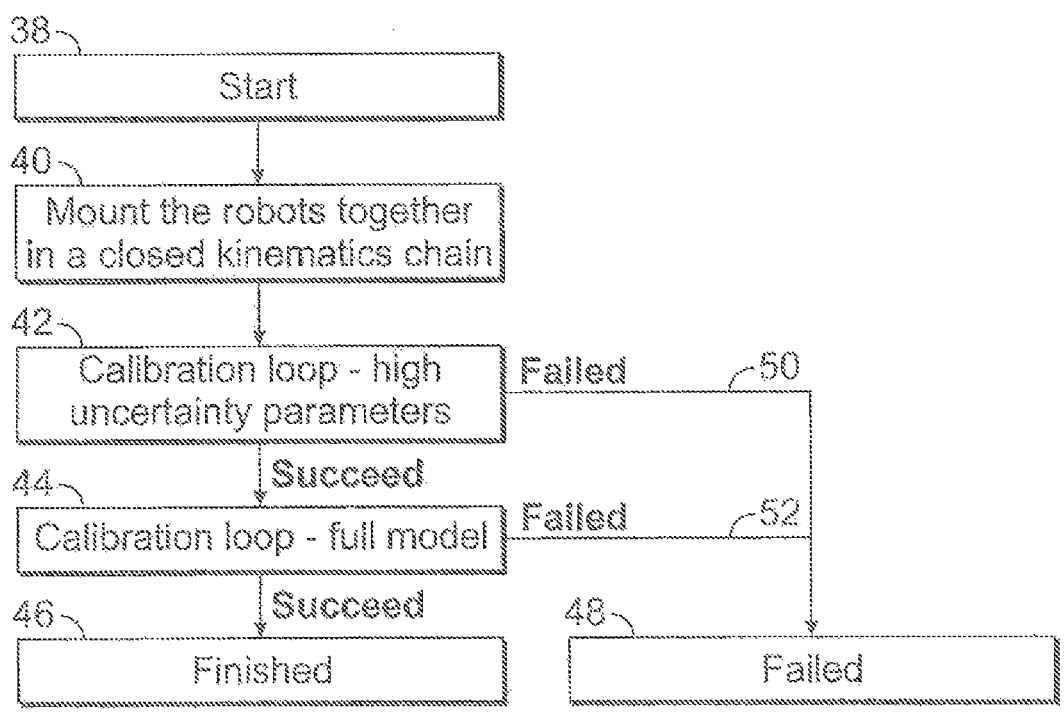
FIG. 11 shows a top level embodiment of a method of calibrating robots.

FIG. 11 shows a top level overall embodiment of a method of calibrating robots in accordance with the invention. In step 38 the method is started, and then in step 40 the robots are mounted together in a closed kinematic chain, and then in step 42 the calibration loop in accordance with an embodiment of the invention is performed for high uncertainty parameters to prime the full calibration with a starting point. If this loop succeeds, then the full model is determined in step 44. If this succeeds, then the calibration is done, as indicated by the block 46. If, however, any of the steps 42 or 44 fails, as indicated by the arrows 50 and 52, respectively, then the calibration fails, as indicated by the block 48.

Figure 12:
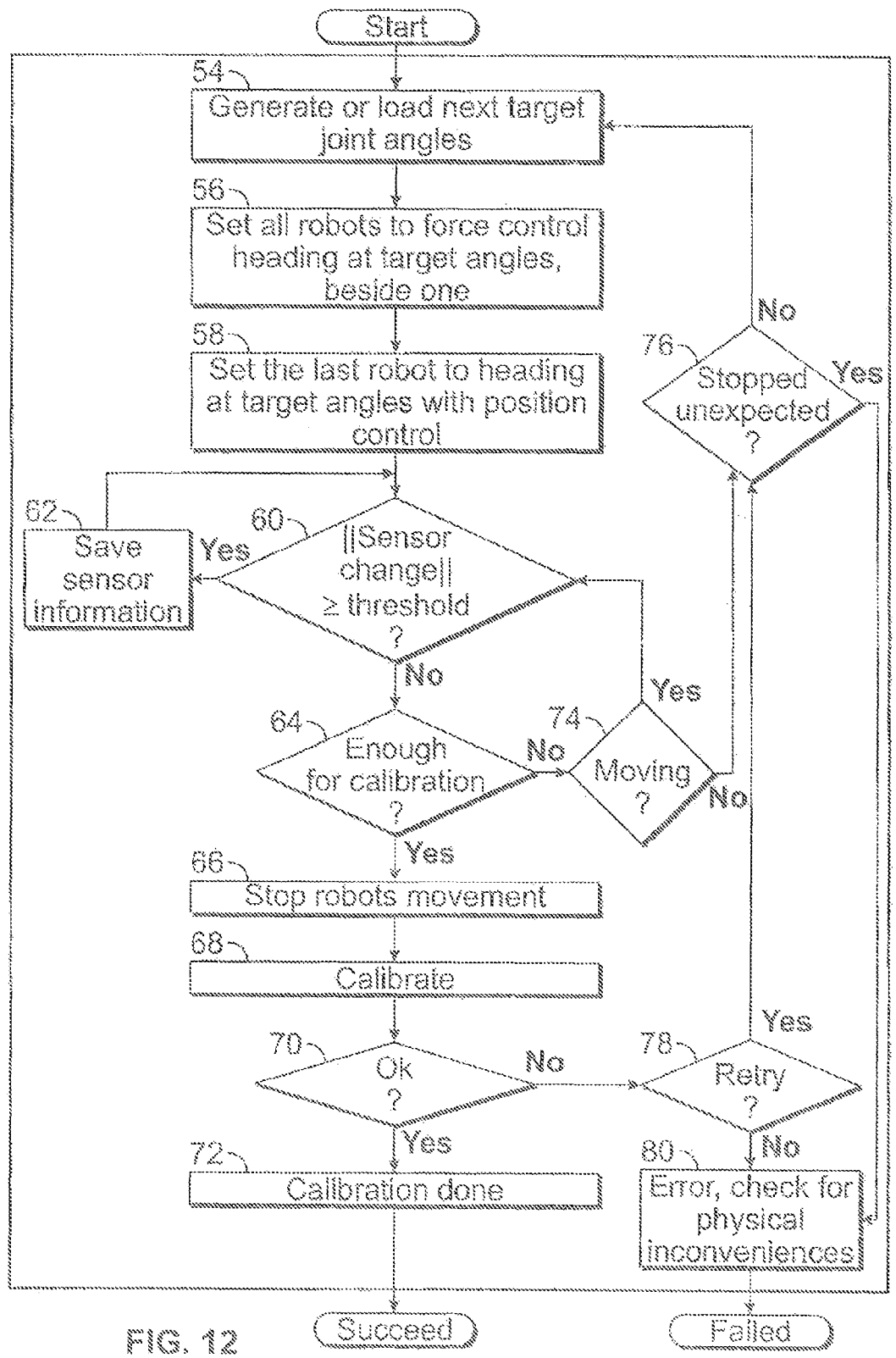
FIG. 12 illustrates a flowchart for an automatic version of an embodiment of the calibration loop.
Figure 13:
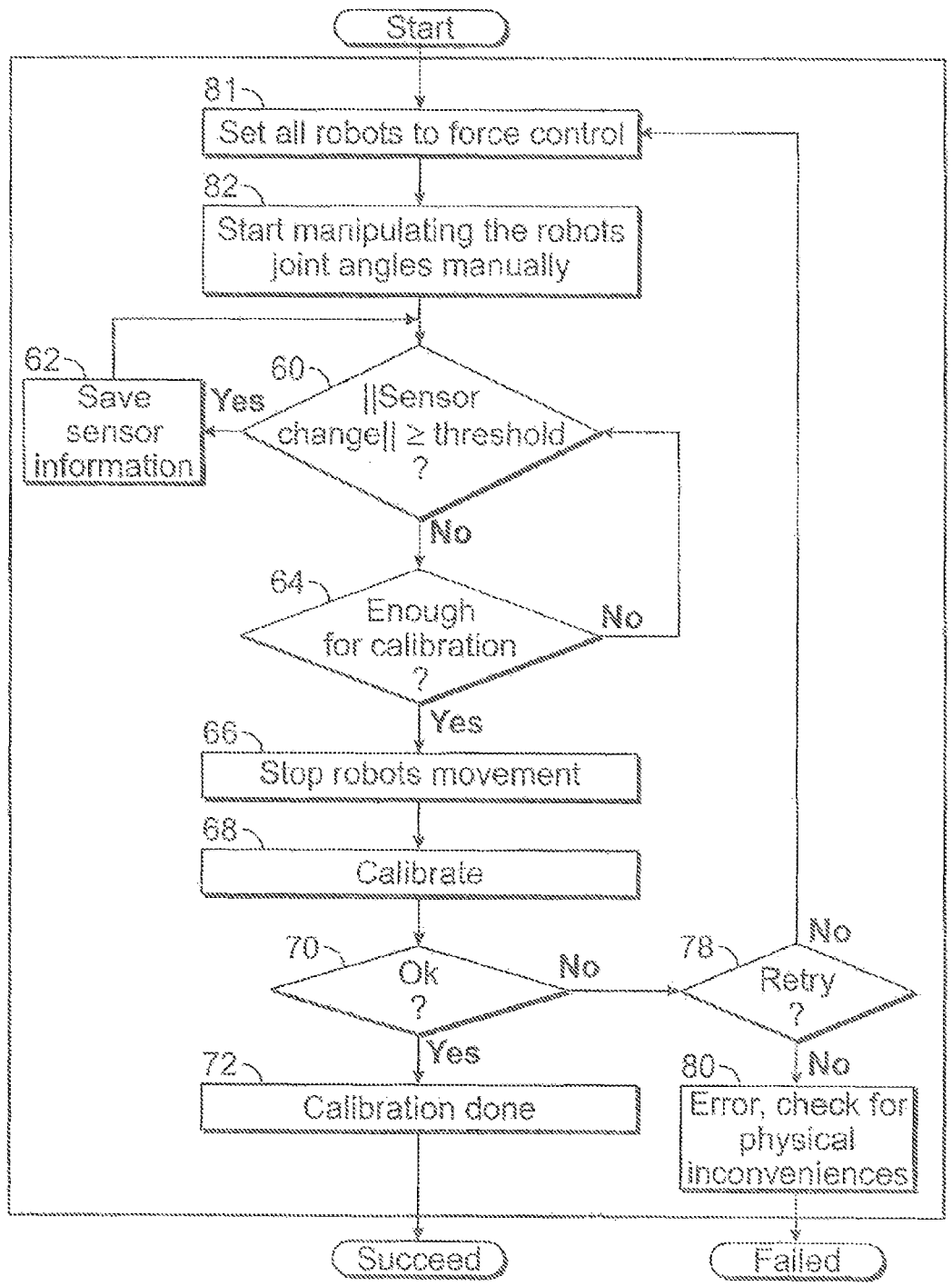
FIG. 13 illustrates a flowchart for a manual version of an embodiment of the calibration loop.

FIGS. 12 and 13 show two alternative ways of implementing the blocks 42 and 44 illustrated in the flow diagram of FIG. 12.

FIG. 12 illustrates an embodiment of an automatic version of the calibration loop 42 and 44 in FIG. 11. In step 54 the next target joint angles are generated or loaded, then in step 56 all robots except one are set to force control heading at the target angles. Then in step 58 the last remaining robot is set to heading at target angles with position control. Then in step 60 it is evaluated whether the change in sensor information is larger than a suitably chosen threshold to avoid identical or nearly identical measurements. If this is the case, then the sensor information is saved as indicated by step 62. On the other hand, if the change in sensor information is lower than said suitably chosen threshold, then it is in the next step 64 evaluated whether enough data has been collected in order to proceed with the calibration. If this is the case, then the robots are stopped from moving, as indicated by step 66, whereafter the calibration is performed, i.e. the models are refined, as indicated by step 68. Then in step 70 it is assessed whether the calibration is ok. If this is the case, then the calibration loop is done as indicated by step 72. If the evaluation in step 64 shows that there has not been collected enough data in order to complete the calibration, then it is checked whether the robots are still moving in step 74, and in the affirmative, the steps 60-64 are repeated. If the robots are not moving, then it is in step 76 ascertained whether the robots have stopped unexpectedly; if this is the case, then in step 80 an error check for physical inconveniencies is performed, e.g. if the robots have collided with the surrounding environment or themselves. If the outcome of the evaluation in step 76 is negative, then the steps from 54 are repeated.

FIG. 13 illustrates an embodiment of a manual version of the calibration loop 42 and 44 in FIG. 11. Since many of the steps in the present method are similar to those of the method illustrated in FIG. 12, only the differences will be explained in the following. The essential difference is that all the robots are set to force control in step 81, and then the joint angles are manipulated manually in step 82, before step 60.

Figure 14:
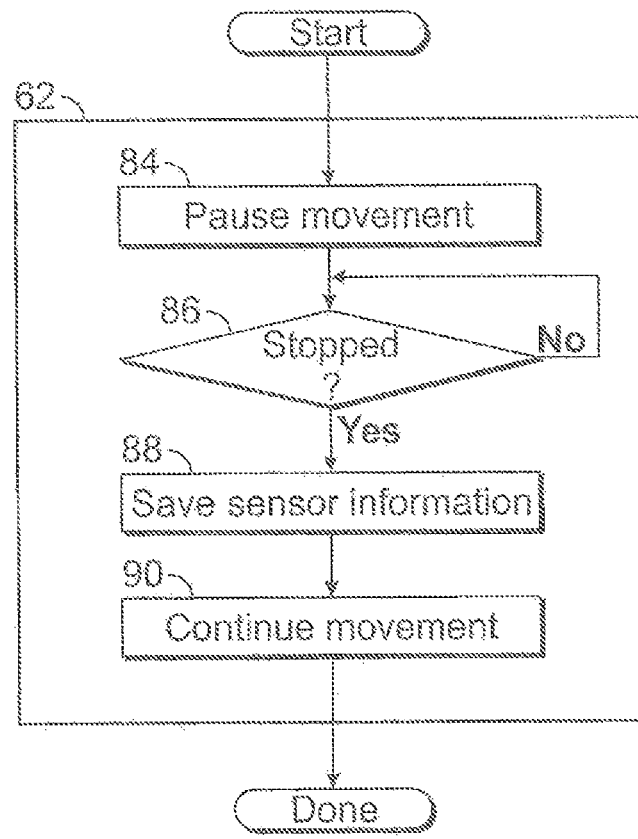
FIG. 14 illustrates a flow chart of an embodiment of a method of saving sensor information of non-synchronized robots.
Figure 15:
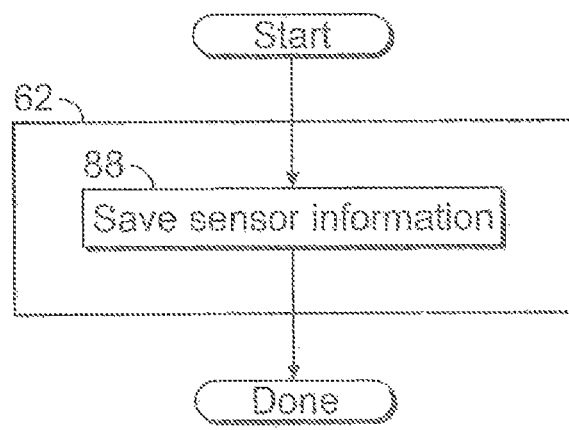
FIG. 15 shows a flow chart of an embodiment of a method of saving sensor information of synchronized robots.

FIG. 14 and FIG. 15 show a flow chart for saving sensor information as indicated by step 62 in FIGS. 12 and 13. FIG. 14 illustrates the flow chart for saving sensor information of non-synchronized robots, and FIG. 15 shows one for synchronized robots. In the first step 84 in FIG. 14, the movement of the robots is paused, then in step 86 it is evaluated whether the robots are stopped, and if affirmative, then the sensor information, e.g. joint angles, is saved in step 88, whereafter movement of the robots is continued in step 90. However, if the robots are synchronized, then the sensor information is saved directly, as indicated by the sub step 88 in the flow chart in FIG. 15. This is possible as the synchronization ensures that the information from all the sensors is collected simultaneously. If this is not done simultaneously, the collected dataset does not reflect a closed chain and the measurements will in that case be unusable. If the robots are not synchronized, it is necessary to stop them before the position pairs are collected in order to ensure the consistency.

Example of Program Duplication

This section will be described as an example of how the closed chain method can be used to duplicate a working program from one robot to another where one or both is un-calibrated. The example takes advantage of the program that is to be duplicated. The program to be duplicated contains way-points of robot configurations. Here a closed chain is obtained by using the way-points to represent the first part of the chain and then—mathematically—close the chain by re-teaching the same way-points with the new robot that is intended to perform the tasks of the first robot. See FIG. 16, where the new robot 6 is illustrated together with a phantom image of the old robot 8.

Data

The generated reference data is based on the program of the robot that is going to be duplicated. The data is collected manually by relearning key way-point positions, which are essential to the task of program. These essential positions may vary in precision depending on the program, but will in most cases be those that are most explicit and easiest to replicate. By relearning these essential positions it is also achieved that the resulting program of the new robot will match in these key positions. If several programs are being duplicated between the same two robots, then those key positions can be reused, thereby leading to a higher level of compliance between them. Depending on the task and the robot tool it may be difficult to determine the correct position and rotation. Especially the rotations may be difficult to replicate correctly if the tool is rotation independent. This can thus reduce the level of knowledge but still be usable as the rotation in these tasks is not that important because of the rotation independence. Depending on the tasks of the robots, the collected data is typically grouped in groups where the essential action of the robot is made. This implies that the relationship between the workspaces of the two robots are only partly known and that correct corresponding configurations can only be provided near the key positions. However, as the other waypoints are not essential for the tasks of the robot it will in the most cases be good enough for the robot executing the tasks of the program. If the program needs to be duplicated back to the original robot, then the same corresponding key positions may be reused. This enables the original program as well as changes in it to be ported back to the original robot. This is particularly interesting if the same program is used in similar robot cells, which thereby enables production to be up-scaled by duplicating the programs without loss of flexibility.

Robot Base Representation

Figure 16:
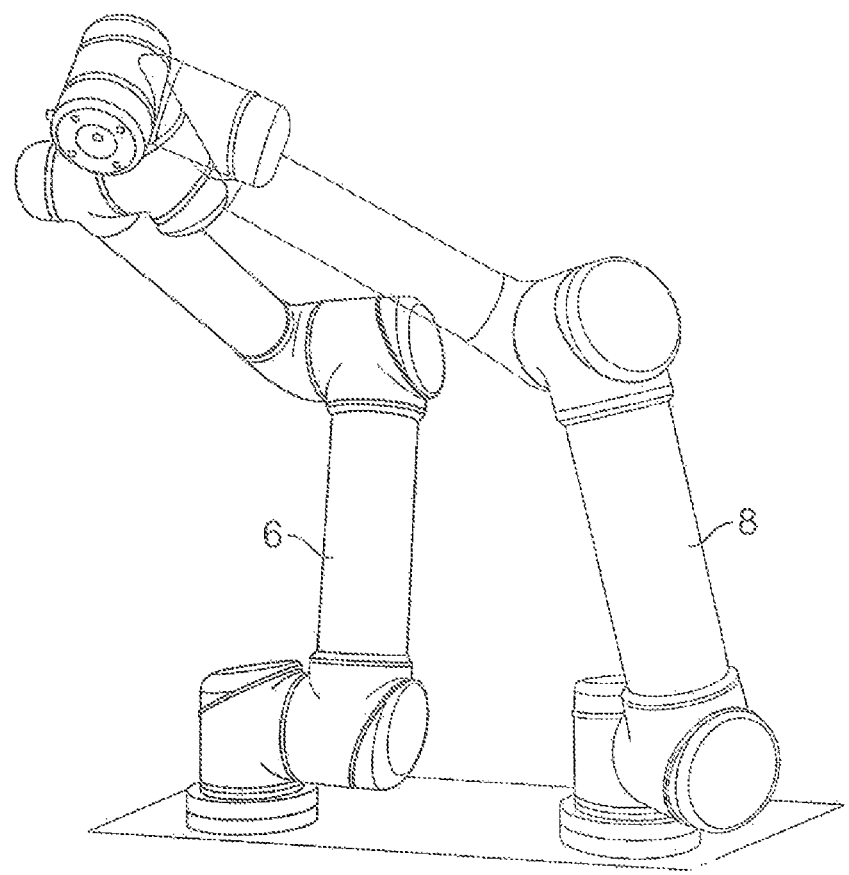
FIG. 16 shows a closed chain, where a new robot is illustrated together with a phantom image of an old robot.

In the present example it is assumed that the same tool is mounted on both robots 6, 8 and that the position of the tool center point is the same (see FIG. 16). Modulation of the transformation between the two base rotation centers of the robots 6, 8 is done by Euler angles, RPY, and 3D position vectors. By using Euler angles, a representation with as few parameters as possible is achieved, which is free of singularities for modest or none adjustment relative to the rotation of displacement of the robots and avoids the need for using a constrained optimization algorithm. The chosen representation is formulated in equation 10 below:

$$T_{RPYxyz}(\theta_x,\theta_y,\theta_z,x,y,z) = T_x(x)_r T_y(y)_r T_z(z)_r T_z(\theta_z)_r T_y(\theta_y)_r T_x(\theta_x)_r \quad (10)$$

Robot Representation

The robots 6, 8 are modulated with three types of Denavit-Hartenberg parameters. The two first ones are the same as used in the calibration example above. However, for modulation of the last joint, a RPY notation is chosen in order to ensure that any position and rotation can be modulated (see equation 11 below). This notation is used because none of the other DH notations can represent any transformation which is needed to modulate any tool flange transformation. Like the base representation, the RPY is a good choice as only modest or none rotation is needed to be modeled. By choosing the right notation for each joint, the result is a representation of the robot without any parameter singularities:

$$RPY_{DH}(r,p,y,x,y,z) = T_z(\theta_z)_r T_y(\theta_y)_r T_x(\theta_x)_r T_x(x)_t T_y(y)_t T_z(z)_t \quad (11)$$

Tool Representation

The transformation that defines where the tool center point is placed relative to the tool flange of the robot is called $T_{tf}^{tcp}$. This transformation is fixed due to the assumption that the same tool is mounted on both robots 6, 8. Furthermore, any small adjustment, which is needed, can be obtained by the parameters of the last joint. In this example, the scale of the model is not important as long as the relative scales of the robots are the same as the scale of the physical robots 6, 8. This is valid as long as the input and output to the method are pure angles, as angles are independent of the scale of the objects as illustrated in FIG. 7.

Full Model

The representation of the model is illustrated in table 2 below. To avoid linearly dependent parameters in the model, some of them are fixed. The parameter θ and d for the base joint of both robots are fixed because the same adjustment can be done by the $T_{base_1}^{base_2}$ representation. One of the robots' last joint transformation $T_5^{ft}$ is fixed because both robots share the tool center point $T_{tf}^{tcp}$ and any small adjustment can be done through both representations of the joints. Accordingly, said parameters depend on each other. Since the method only receives joint angle information it is necessary to fix a physical length in order to avoid a linear dependency related to the scale of the model or use statistical information. In this case, it has been chosen to use statistical information to regulate the optimization method as this makes the method usable even though the problem is ill-posed/undetermined. The chosen regulation method is based on Tikhonov regulation for ill-posed equations. This enables the least square optimization to select a solution closest to the expected amount of infinity possibilities. The amount N of adjustable parameters for each robot fulfils equation below, for a minimal and complete notation as the $T_{base_1}^{base_2}$ and $T_5^{ft}$ is reused for both robots R=Number of revolute joints. T=Number of prismatic joints. N=4R+2T+6. In this example R=6 and T=0, which gives N=30.

TABLE 2 describing the adjustable and fixed parameters
of the representation of the model.

| Description | Robot$_6$ | Robot$_8$ |
|---|---|---|
| $T_{tf}^{tcp}$ | | fixed |
| $T_{wrist3}^{tf}$ | $RPY_{DH}(\acute{r},\acute{p},\acute{y},\acute{x},\acute{y},\acute{z})$ | $RPY_{DH}(r, p, y, x, y, z)$ |
| $T_{wrist2}^{wrist3}$ | $\Phi_{DH}(\theta, d, \alpha, a)$ | $\Phi_{DH}(\theta, d, \alpha, a)$ |
| $T_{wrist1}^{wrist2}$ | $\Phi_{DH}(\theta, d, \alpha, a)$ | $\Phi_{DH}(\theta, d, \alpha, a)$ |
| $T_{elbow}^{wrist1}$ | $\Psi_{DH}(\beta, b, \alpha, a)$ | $\Psi_{DH}(\beta, b, \alpha, a)$ |
| $T_{shoulder}^{elbow}$ | $\Psi_{DH}(\beta, b, \alpha, a)$ | $\Psi_{DH}(\beta, b, \alpha, a)$ |
| $T_{base}^{shoulder}$ | $\Phi_{DH}(\emptyset, \phi, \alpha, a)$ | $\Phi_{DH}(\emptyset, \phi, \alpha, a)$ |
| $T_{base_6}^{base_8}$ | | $T_{PRYxyz}(\theta_x, \theta_y, \theta_z, x, y, z)$ |

Figure 17:
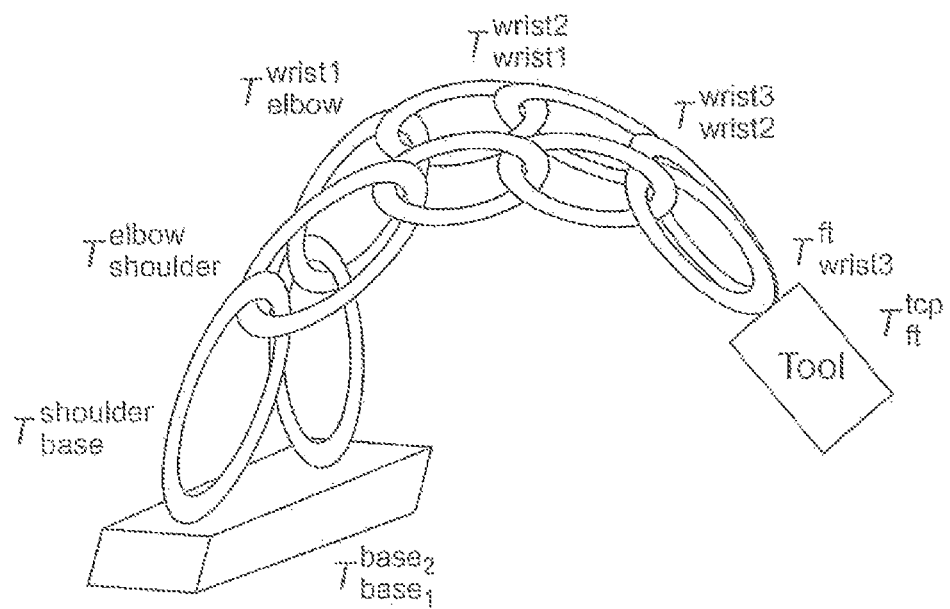
FIG. 17 illustrates where the transformations in table 2 are placed in the system.
Figure 1B:
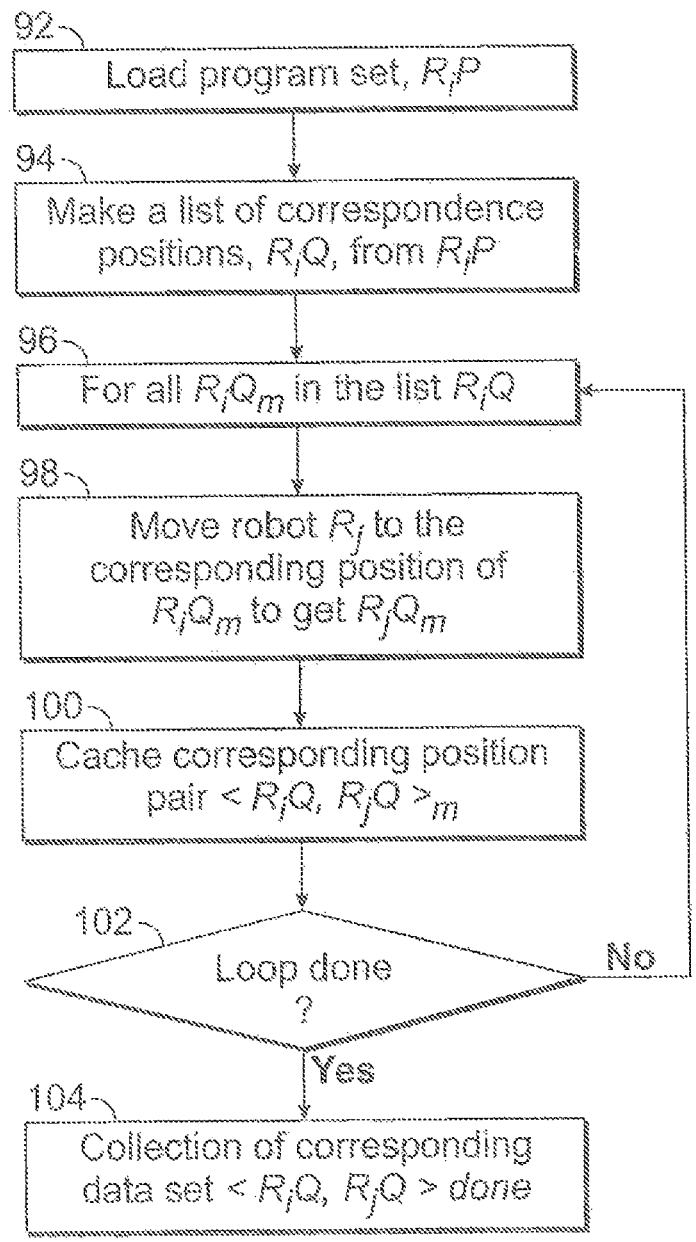

In FIG. 17 is shown a schematic illustration of where the transformations in table 2 are placed in the system.

Figure 19:
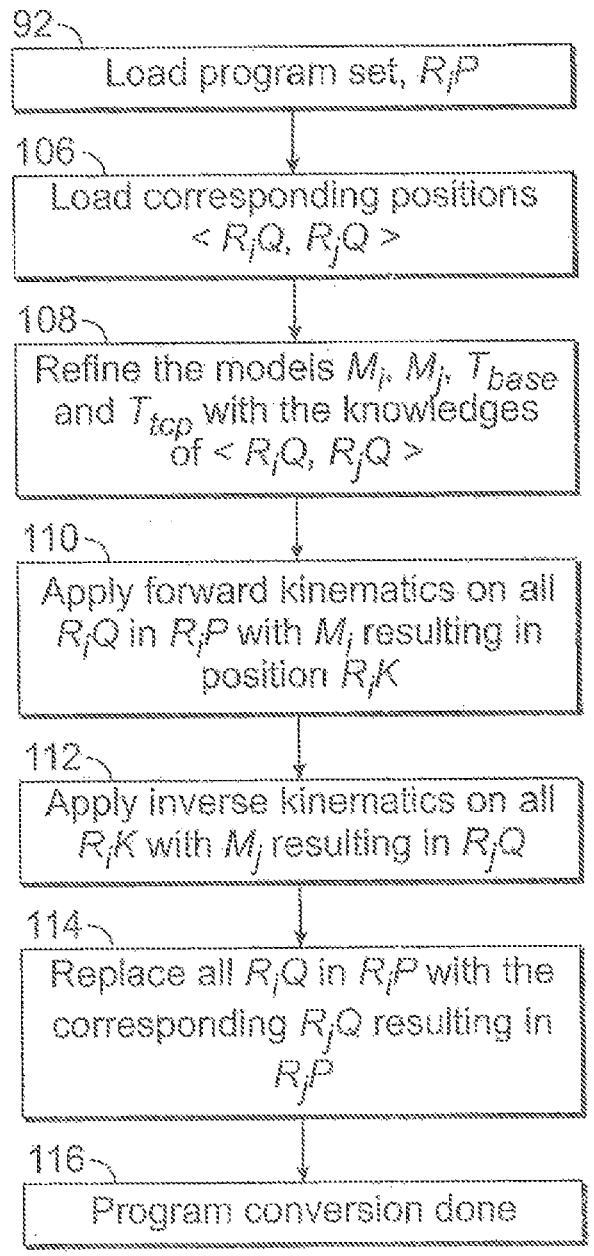
FIG. 19 illustrates an embodiment of a flowchart for program conversion.

In FIG. 18 is shown an embodiment of a flowchart for collecting position pairs to be used in a program conversion as illustrated in FIG. 19. In the following it is assumed that robot j has been replaced by robot i. Each robot has multiple joints, a base flange, and a tool flange. In the first step 92, a program set $R_iP$ is loaded, and then a number of positions or angles $R_iQ$ in accordance with the working program $R_iP$ are chosen in the next step 94. These positions—and thereby the corresponding angles $R_iQ$ are preferably essential way-points in the programmed task. Then in step 96, for all $R_iQ_m$ in the list $R_iQ$, step 98 is performed. In step 98 the robot $R_j$ is moved to those corresponding positions of $R_iQ_m$ positions, which then are saved in step 100 as a position or angle pair set $<R_iQ, R_jQ>_m$. As indicated by the block 102, the steps 96-100 are repeated if the loop is not done. However, when the loop is done, the result is a position or angle pair data set $<R_iQ, R_jQ>$, as indicated by block 104.

In FIG. 19 is shown an embodiment of a flowchart for program conversion, i.e. for copying a working program from robot i to robot j, using the above mentioned collected data set. In step 92 a program $R_iP$ is loaded. Then in step 106, the corresponding position or angle pair data set $<R_iQ, R_jQ>$ is loaded. Then in step 108, the kinematic models $M_i$, $M_j$, $T_{base}$ and $T_{tcp}$ are estimated using the collected position or angle pair data set $<R_iQ, R_jQ>$ and the closed chain rule. Then in step 110 forward kinematics is applied on all $R_iQ$ in $R_iP$ with $M_i$, thereby resulting in $R_iK$. Whereafter in step 112, inverse kinematics is applied on all $R_iK$ with $M_j$, thereby resulting in $R_jQ$. Then in step 114 all $R_iQ$ in $R_iP$ are replaced with the corresponding $R_jQ$ resulting in $R_jP$, whereby the program conversion is completed as indicated by the block 116.

Figure 20:
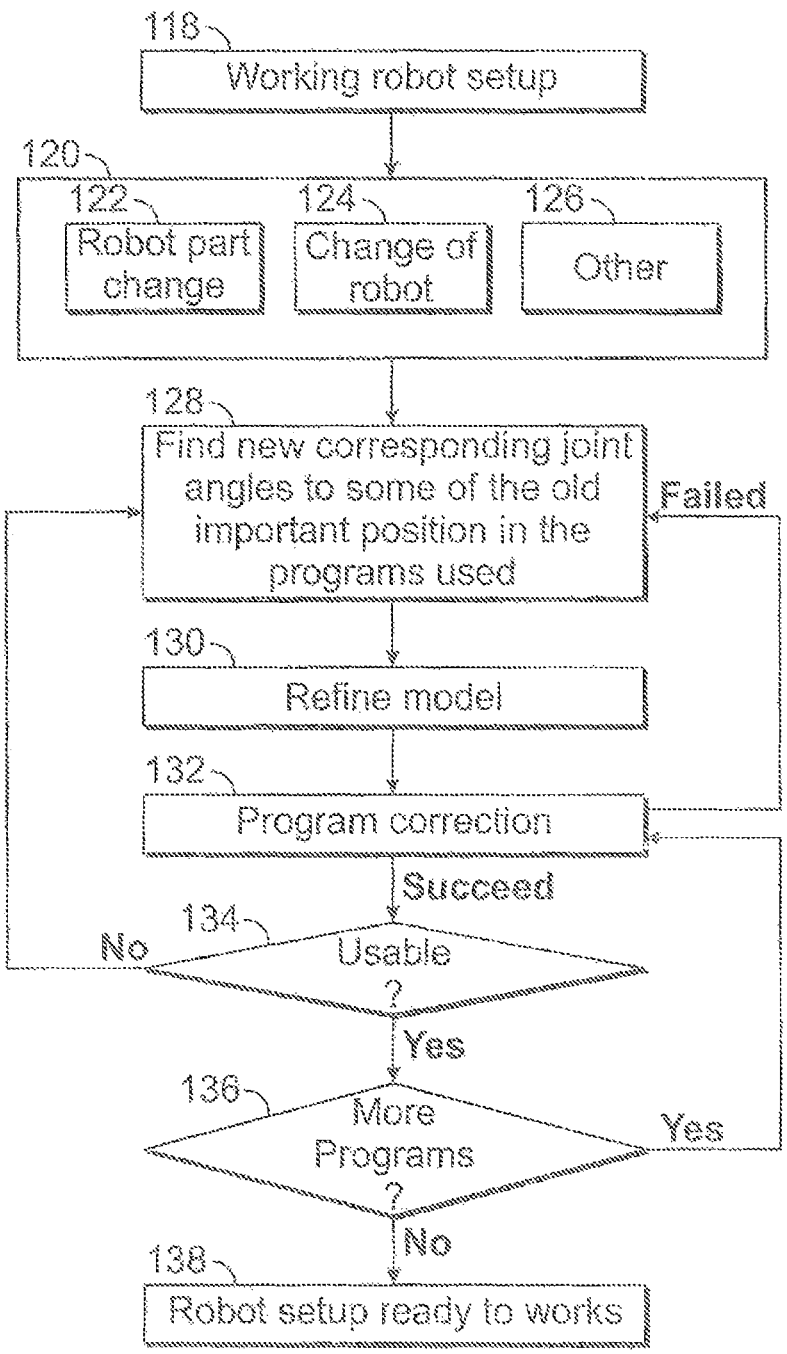
FIG. 20 shows a flow diagram of an embodiment of a method for program conversion.

FIG. 20 shows a top level flowchart for program correction. The starting point is a working robot installation performing a task described in its programs as indicated in step 188. Then in step 120 a change in the setup is performed, e.g. in case of a mechanical breakdown. This could be the change of a robot, e.g. replacement of a joint of it, as indicated by block 122, or a replacement of the robot as indicated by block 124, or some other change in the setup as described by block 126. Then in the next step 128—using the new robot part (e.g. whole new robot)—new corresponding joint angles to some of the old important positions in the program are determined. Thereby joint angle pairs data of the old and new robot are determined. These data are then in step 130 used to refine the kinematic models of the old and new robots using the closed chain properties. Whereafter in step 132 the program conversion is performed as described above. If the program correction fails, then the steps 128-132 are repeated. However, if the program correction succeeds, then it is, in step 134, determined whether the program is usable, for example by letting it run on the new robot. This can for example be done by evaluating whether the program can run on the second robot within suitably chosen tolerances.

If the program is usable, then it is in the next step—optional step 136—evaluated whether more programs need to be converted, and if affirmative, then perform the steps 132-136 where the given angle pairs can be adjusted or additional can be added. Otherwise, the program is ready to use, as indicated by block 138 in the illustrated flowchart.

Figure 21:
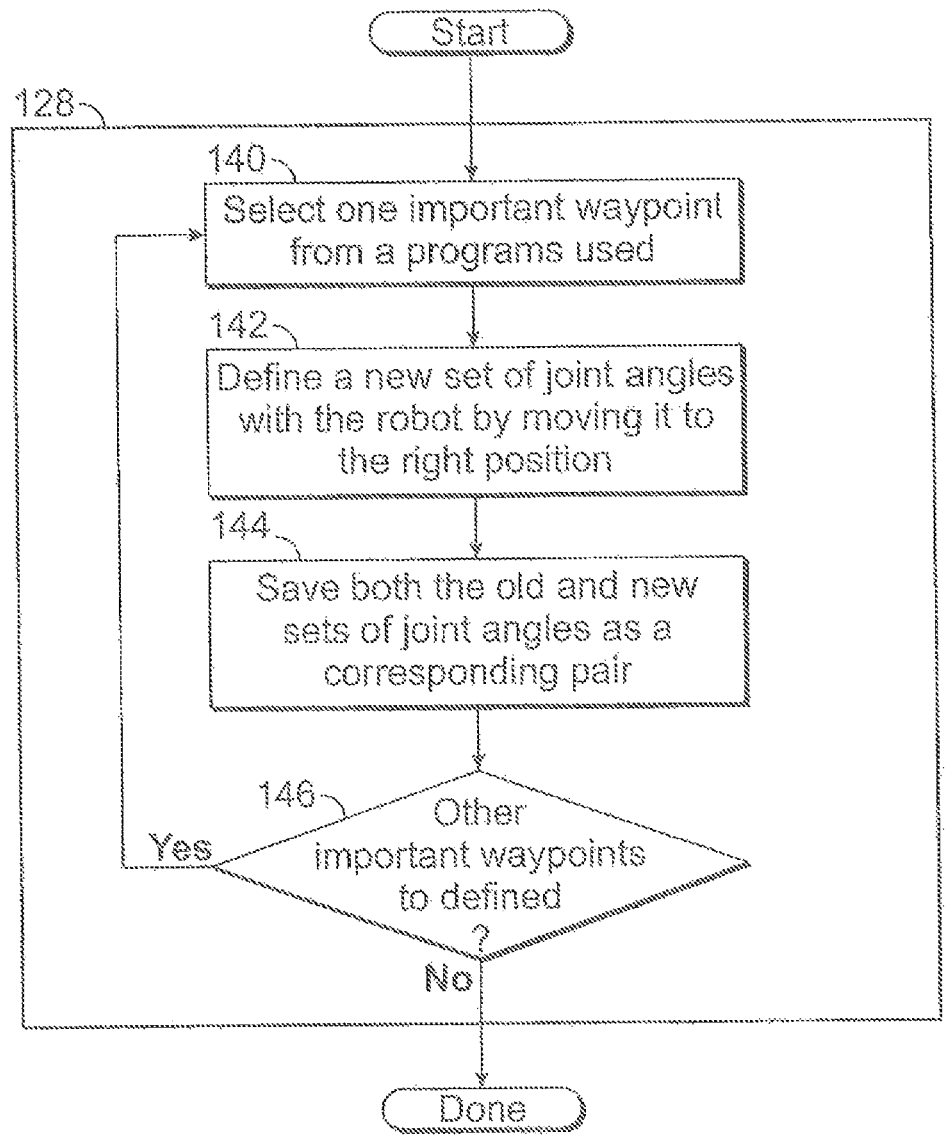
FIG. 21 shows a flow diagram of an embodiment of a method for defining the joint angles.

FIG. 21 shows a flowchart illustrating in more details an embodiment of how step 128 in the above described flowchart illustrated in FIG. 20 could be performed. The illustrated method is iterative: First, in step 140, one important waypoint from the program is used, then, in step 142, a new set of joint angles of the new robot is defined by moving it to the right position. Then in step 144, both the old and new set of joint angles is saved as a corresponding pair. Then, in the last step 146, it is determined whether other important waypoints need to be defined. If yes, then the steps 140-146 are repeated. If no, then the angle pairs are used in the next step of updating the models (see step 130 in FIG. 20).

Figure 22:
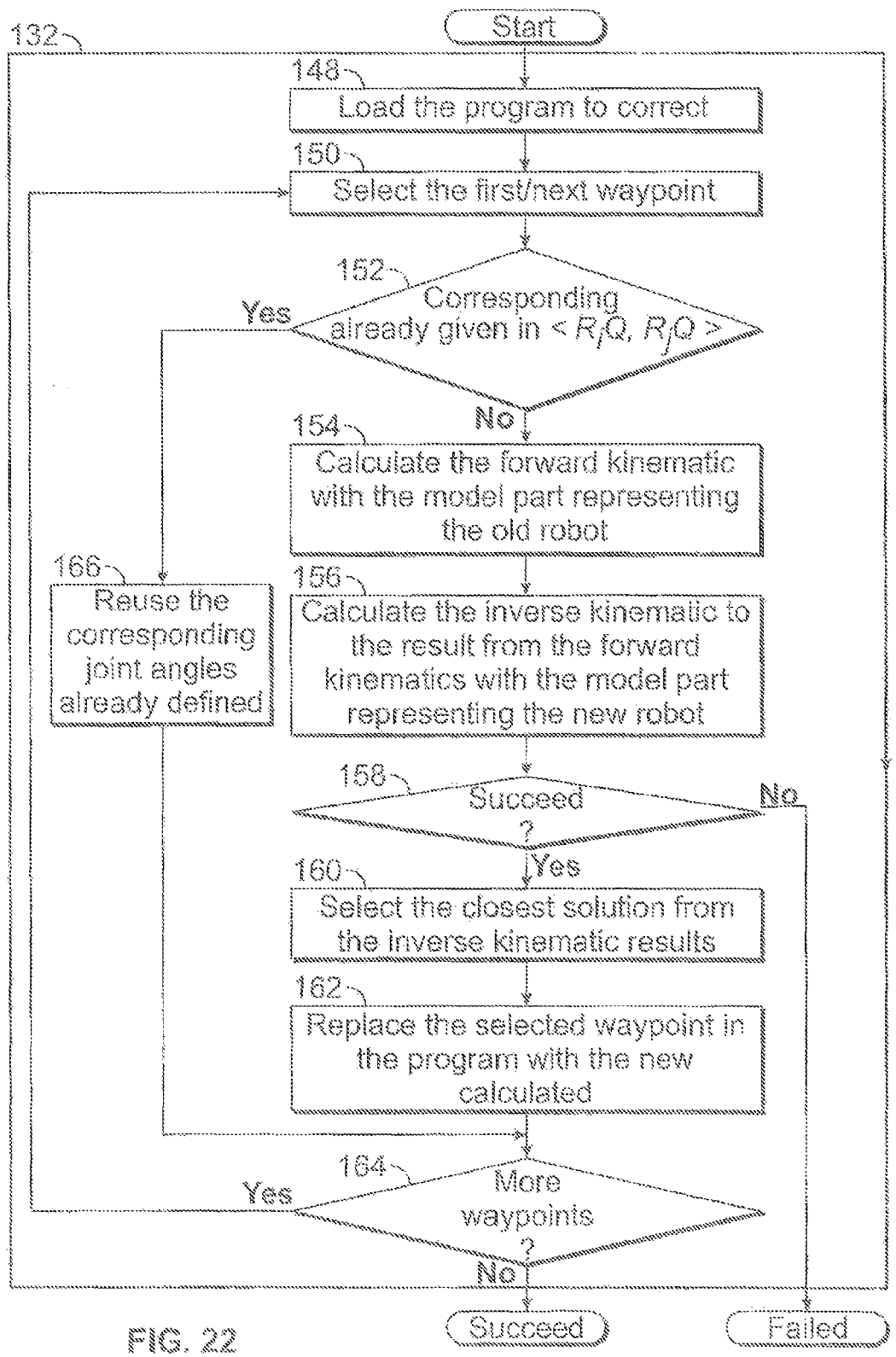
FIG. 22 shows a flowchart of an embodiment of a method of performing a program conversion between un-calibrated robots.

In FIG. 22 is illustrated in more detail an embodiment of how step 132 of correcting/converting a program can be performed. As illustrated, the first step is to load a program 148 to correct and then in the next step, a first waypoint is determined. In step 152 it is evaluated whether the corresponding position is already defined by step 128. If it is not, then, in step 154, forward kinematics is applied using the model representing the old robot, thereby yielding a result on which result inverse kinematics is calculated using the model representing the new robot, as indicated by step 156. Then in step 158 it is evaluated, whether the calculations succeeded. And if yes, then in step 160 the closest solution calculated by inverse kinematics is selected. Then in the next step 162, the old waypoint is replaced with the new calculated one. Finally, in step 164 it is evaluated whether more waypoints are needed, and if yes, then perform the steps 150-164. If the outcome of the evaluation in step 152 is true, then the corresponding joint angles already defined are used, as indicated by step 166.

As illustrated it is by the invention possible to perform program conversions between robots, which are un-calibrated.

LIST OF REFERENCE NUMBERS

In the following is given a list of reference numbers that are used in the detailed description of the invention.

2 tool flange adapter 4 base flange adapter 6, 8 robots 10 base flanges 16 common normal between rotational axes 16, 20 rotational axes 22-36 method steps, calibration 38-52 method steps, calibration 54-82 method steps, automatic and manual calibration loop 84-90 method steps, saving of sensor information 92-104 method steps, collection of angle data pairs 106-116 method steps, program conversion 118-138 method steps, program correction 140-146 method steps, definition of joint angles 148-166 method steps, correction of program

The invention claimed is:

1. A method of calibrating robots, the method comprising:
   (a) providing at least two robots, each robot having a respective tool flange and joints and/or links connecting two flanges: a base flange and the respective tool flange of the robot,
   (b) forming a closed chain from the at least two robots,
   (c) manipulating at least one of the links or joints in the closed chain, thereby inducing manipulations of some of the other links or joints in the closed chain, and then
   (d) estimating kinematic models for each robot based on sensor information associated with the joints and/or links of each of the at least two robots.

2. The method according to claim 1, where the sensor information is obtained from the same sensors, which are used to drive the robot joints and/or links.

3. The method according to claim 2, where the sensor information is only obtained from the same sensors, which are used to drive the robot joints and/or links.

4. The method according to claim 1, wherein step (c) comprises:
   changing the joint positions, and thereby the position of the joints of each of the at least two robots, and
   collecting corresponding position pairs.

5. The method according to claim 4, wherein the sensor information is information about the position of the joints, and wherein step (d) comprises estimating the kinematic models based on the collected corresponding position pairs.

6. The method according to claim 4, further comprising evaluating whether sufficient position pair data are obtained after step (d), and then
   repeat step (d) if not sufficient position pair data are obtained in order to update the kinematic models.

7. The method according to claim 1, wherein the sensor information comprises any of the following and/or changes in any of the following: angles, position coordinates, or derivatives of the angles or the position coordinates.

8. The method according to claim 1, wherein the sensor information comprises any of the following and/or changes in any of the following: force, torque, or derivatives of the force or the torque.

9. The method according to claim 1, wherein step (b) of forming a closed chain from the at least two robots is performed by physically connecting said at least two robots at least at their base flanges, and/or at their respective tool flanges.

10. The method according to claim 1, wherein step (b) of forming the closed chain from the at least two robots further comprises a step of fixing at least one distance between the at least two robots.

11. The method according to claim 1, wherein step (b) of forming a closed chain from the at least two robots further comprises a step of fixing at least one direction of a connection between the at least two robots in the closed chain.

12. The method according to claim 1, wherein step (b) of forming a closed chain from the at least two robots comprises a step of using measurement equipment to measure relative positions between the at least two robots.

13. The method according to claim 12, wherein the measurement equipment is configured for measuring a distance between parts of the at least two robots.

14. The method according to claim 12, wherein the measurement equipment is configured for determining a direction between parts of the at least two robots.

15. The method according to claim 14, wherein the measurement equipment is at least one ball bar connecting the at least two robots.

16. The method according to claim 1, wherein a connecting flanges of the at least two robots do not share a same rotational axis.

17. The method according to claim 1, wherein the step (d) of estimating the kinematic models is furthermore based on an estimation or measurement of the offset between the at least two robots at their base flanges, and at their respective tool flanges.

18. The method according to claim 1, wherein the step (d) of estimating the kinematic models is furthermore based on statistical information about at least one part of the closed chain.

19. The method according to claim 18, wherein the statistical information is used to estimate the models based on sensor information which exceeds the number of equations, without statistical information, to be solved.

20. The method according to claim 1, further comprising evaluating whether sufficient sensor information associated with the joints of each of the at least two robots is obtained after step (c), but before step (d).

21. The method according to claim 20, wherein sufficient sensor information corresponds to a number of unknowns, which does not exceed number of equations to be solved in order to estimate the kinematic models.

22. The method according to claim 21, comprising collecting an overhead percentage (OPI) of sensor information, in addition to what is necessary for solving the equations in order to estimate the kinematic models.

23. The method according to claim 22, further comprising:
   retaining at least a fraction of said overhead percentage (OPI) of sensor information from being used to update the kinematic models,
   saving said fraction of said overhead percentage (OPI) of sensor information on a data storage device, and
   verifying a calibration using said fraction of overhead percentage of sensor information.

24. The method according to claim 23, wherein verifying the calibration comprises the steps of comparing said fraction of the overhead percentage of sensor information with corresponding values predicted by the kinematic models for the robots.

25. The method according to claim 24, wherein said comparison is performed by calculating a difference between every one of said fraction of the overhead percentage of sensor information and corresponding values predicted by the kinematic models for the robots, and comparing said difference or its numerical value with a threshold value.

26. The method according to claim 22, wherein said overhead percentage of sensor information is in the range between 10% and 200%, preferably between 20% and 80%, even more preferably between 20% and 60% or alternatively in the range between 10% and 20%, or in the range between 20% and 40%, or in the range between 40% and 60%, or in the range between 60% and 80%, or in the range between 80% and 100%, or in the range between 100% and 120%, or in the range between 120% and 140%, or in the range between 140% and 160%, or in the range between 160% and 200%.

27. The method according to claim 1, further comprising the step of saving the kinematic models on a data storage device.

28. The method according to claim 1, wherein the step (c) of manipulating at least one of the joints or links in the closed chain is performed by turning off at least one position regulator of the joints of one of said at least two robots, and letting it be led around by the other robot.

29. The method according to claim 1, wherein the step (c) of manipulating at least one of the joints or links in the closed chain is performed by turning off at least one position regulator of the joints of each of said at least two robots, and changing a joint position externally.

30. The method according claim 29, wherein the step (c) of manipulating at least one of the joints or links in the closed chain is performed by turning off at least one position regulator of the joints of each of said at least two robots, and changing the joint position manually.

31. The method according to claim 1, wherein the kinematic models are determined by parameters defining transformations.

32. The method according to claim 31, wherein the parameters are two types of Denavit-Hartenberg parameters.

33. The method according to claim 32, wherein the two types of Denavit-Hartenberg parameters are represented by the Schilling parameters, and the parallel Denavit-Hartenberg variant parameters, respectively.

34. The method according to claim 1, further comprising adjusting the force by which the at least two robots operate.

35. The method according to claim 1, wherein each of the kinematic models comprises a transformation for each joint.

36. The method according to claim 1, further comprising connecting N additional robots in parallel or in series with the at least two robots, N being a natural number, and performing the steps of claim 1 for each additional N robots.

37. The method according to claim 1, wherein said at least two robots are two robot arms of a single robot.

38. The method according to claim 37, wherein at least one of said robot arms is an articulated robot arm.

39. The method according to claim 37, wherein at least one of said robot arms comprises a prismatic joint.

40. The method according to claim 37, wherein said single robot has one base flange and at least two tool flanges.

* * * * *